(12) United States Patent
Kadowaki

(10) Patent No.: US 9,182,532 B2
(45) Date of Patent: Nov. 10, 2015

(54) DISPLAY DEVICE

(71) Applicant: Sharp Kabushiki Kaisha, Osaka (JP)

(72) Inventor: Shinya Kadowaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/391,830

(22) PCT Filed: Apr. 15, 2013

(86) PCT No.: PCT/JP2013/061152
§ 371 (c)(1),
(2) Date: Oct. 10, 2014

(87) PCT Pub. No.: WO2013/157510
PCT Pub. Date: Oct. 24, 2013

(65) Prior Publication Data
US 2015/0062870 A1 Mar. 5, 2015

(30) Foreign Application Priority Data
Apr. 16, 2012 (JP) .................................. 2012-092854

(51) Int. Cl.
*F21V 8/00* (2006.01)
*G02F 1/1335* (2006.01)

(52) U.S. Cl.
CPC .............. *G02B 6/005* (2013.01); *G02B 6/0073* (2013.01); *G02F 1/133502* (2013.01); *G02F 1/133617* (2013.01); *G02F 2201/38* (2013.01)

(58) Field of Classification Search
CPC  G02B 6/005; G02B 6/0073; G02F 1/133502; G02F 1/133617; G02F 2201/38
See application file for complete search history.

(56) References Cited

U.S. PATENT DOCUMENTS

| 6,469,755 B1 | 10/2002 | Adachi et al. |
| 7,071,616 B2 * | 7/2006 | Shimizu ............ C09K 11/7767 313/506 |
| 2002/0145685 A1 | 10/2002 | Mueller-Mach et al. |
| 2012/0019740 A1 * | 1/2012 | Kadowaki .............. G02B 5/201 349/61 |
| 2013/0002986 A1 * | 1/2013 | Kadowaki ......... G02F 1/133617 349/65 |
| 2015/0131029 A1 * | 5/2015 | Kaida ................... G02F 1/1336 349/69 |

FOREIGN PATENT DOCUMENTS

| JP | 2000-131683 A | 5/2000 |
| JP | 2003-5182 A | 1/2003 |
| JP | 2010-66437 A | 3/2010 |
| WO | 2011/145247 A1 | 11/2011 |

* cited by examiner

*Primary Examiner* — Stephen F Husar
(74) *Attorney, Agent, or Firm* — Chen Yoshimura LLP

(57) ABSTRACT

The purpose of the present invention is to provide a display device in which light emitted from a phosphor is used with enhanced efficiency. A display device is provided with a light source unit for emitting light, a plurality of phosphors for emitting light upon incidence thereon of light from the light source unit, a transparent substrate disposed on the phosphors, a color conversion substrate formed between the phosphors and the transparent substrate and including a reflective member and a low refractive index layer having a refractive index lower than that of the phosphors, and an air layer between the phosphors and the light source unit.

11 Claims, 23 Drawing Sheets

DISPLAY DEVICE

TECHNICAL FIELD

The present invention relates to a display device.

BACKGROUND ART

Various image display devices provided with a phosphor substrate have been proposed up to now. The display devices disclosed in Japanese Patent Application Laid-Open Publication No. 2000-131683 and Japanese Patent Application Laid-Open Publication No. 2003-5182, for example, are provided with a liquid crystal display component, a light source that illuminates the liquid crystal display component from the rear side, and a wavelength converting section. The wavelength converting section includes at least one type of phosphor for converting wavelength that converts light from the light source into red or green, and this wavelength converting section is provided for each pixel on the light emitting side of the liquid crystal display component.

Furthermore, the display device disclosed in Japanese Patent Application Laid-Open Publication No. 2010-66437 is provided with a front plate, a light shutter, and a light source. The front plate has a plurality of light scattering members that generate diffused light and a planarizing film formed so as to cover the light scattering members.

The light scattering members include a red phosphor that converts blue light to red light, a green phosphor that converts blue light to green light, and a blue light scattering member that scatters blue collimated light.

The light shutter is a liquid crystal display component. A polarizing plate is provided on the uppermost layer of the liquid crystal display component. A polarizing plate of the light shutter and a planarizing film of the front plate are bonded by an adhesive.

RELATED ART DOCUMENTS

Patent Documents

Patent Document 1: Japanese Patent Application Laid-Open Publication No. 2000-131683
Patent Document 2: Japanese Patent Application Laid-Open Publication No. 2003-5182
Patent Document 3: Japanese Patent Application Laid-Open Publication No. 2010-66437

SUMMARY OF THE INVENTION

Problems to be Solved by the Invention

In a display device provided with a phosphor similar to those mentioned above, in general, an adhesive layer is inserted between the light source unit and the color conversion substrate that includes the phosphor so as to fix the light conversion substrate to the light source unit.

If light with a prescribed frequency band from a light source unit enters the phosphor, the phosphor becomes excited, and emits a light with a prescribed frequency band.

Because the phosphor emits light radially, a portion of light from the phosphor is emitted towards the light source unit in some cases.

In such a case, if there is an adhesive layer or the like between the light source unit and the phosphor, then among the light emitted by the phosphor, the light traveling toward the light source unit enters into the adhesive layer. As a result, there is a problem of the light use efficiency decreasing.

Furthermore, the phosphor is formed on the main surface of a transparent substrate, but because the phosphor has a higher refractive index than the glass substrate, light with a large incident angle enters the glass substrate. In many cases, light with a large incident angle does not travel toward the viewer when exiting from the glass substrate towards the outside. In this manner, a display device provided with a conventional phosphor has a problem in that the light use efficiency thereof of the light from the phosphor is low.

The present invention was made in view of the above-mentioned problem, and an object thereof is to provide a display device aiming to improve the light use efficiency of light emitted from a phosphor.

Means for Solving the Problems

The display device related to the present invention includes a light source unit that emits light; and a color conversion substrate above the light source unit, including: a transparent substrate; a plurality of phosphors arranged on a main surface of the transparent substrate facing the light source unit, the phosphors receiving light from the light source unit and emitting light in response thereto; a low refractive index layer that is formed between the phosphors and the transparent substrate and that has a lower refractive index than the phosphors; and a reflective member that reflects light that is emitted sideways by the respective phosphors, the reflective member having a plurality of openings therein and being disposed so as to cover at least edges of the respective phosphors, wherein the phosphors and the light source unit are configured to define an air layer therebetween.

In the above-mentioned configuration, it is preferable that is a space be disposed between the color conversation and the light source unit. In another configuration, it is preferable that the spacer be disposed between the reflective member and the light source unit. In another configuration, a plurality of the spacers are provided between the color conversation substrate and the light source unit.

In the above-mentioned configuration, it is preferable that the color conversion substrate include a transparent resin pattern disposed in spaces between the phosphors, wherein the transparent resin pattern has a groove formed between the phosphors, and wherein the spacer is formed between the phosphors in an extending direction of the groove. In another configuration, it is preferable that the plurality of phosphors be arranged so as to have gaps therebetween, wherein the spacer is disposed between the phosphors. In another configuration, it is preferable that the phosphors each have a receiving surface that faces the light source unit and receives light therefrom, wherein the spacer is formed in a looped shape so as to extend along a periphery of the receiving surface of the respective phosphors. In another configuration, it is preferable that the spacer be formed of a material have light-shielding characteristics. In another configuration, it is preferable that a light scattering member formed on a main surface of the transparent substrate be further included, wherein the light source unit and the light scattering member are configured to define an air layer therebetween.

It is preferable that each of the phosphors include a receiving surface that receives light from the light source unit, an emitting surface that is opposite to the transparent substrate, and side faces, wherein the color conversion substrate includes a transparent resin pattern that covers the side faces of the respective phosphors, wherein the transparent resin pattern has a protrusion that protrudes farther towards the light source unit than the receiving surface of the respective phosphors, and wherein the respective phosphors and the light source unit are configured to define an air layer between the receiving surface of the respective phosphors and the light source unit.

The transparent resin pattern be formed in a looped shape so as to surround the respective phosphors, wherein the resin layer further includes a surface facing the light source unit and side faces attached to the side faces of the respective phosphors, and wherein the reflective member is formed across the side faces of the resin layer facing the light source unit so as to cover the side faces of the respective phosphors.

Effects of the Invention

According to the display device related to the present invention, an improvement in light use efficiency of the light emitted by a phosphor can be achieved.

DETAILED DESCRIPTION OF EMBODIMENTS

Embodiment 1

Figure 1:
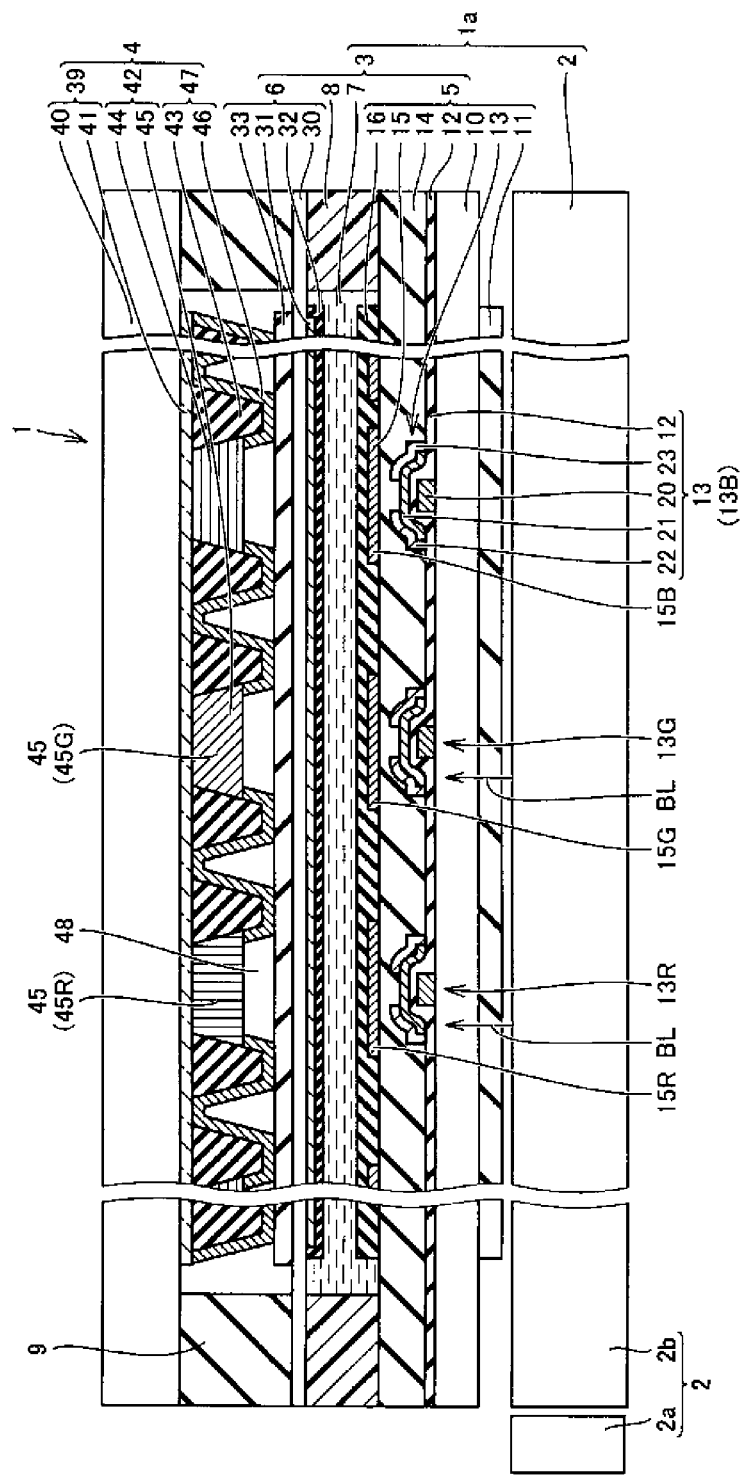
FIG. 1 is a cross-sectional view of a display device 1 according to Embodiment 1.

FIG. 1 is a cross-sectional view of a display device 1 according to Embodiment 1. As shown in FIG. 1, the display device 1 is provided with a light source unit 1a including a light source module 2 and a light shutter 3, and a color conversion substrate 4 disposed on the light source unit 1a.

The light source unit 1a includes the light source module 2 that emits blue light BL and the light shutter 3 disposed on the light source module 2. The light shutter 3 and a color conversion substrate 4 are connected to each other by a fixing member 9.

The light source module 2 is provided with a light guide plate 2b, a plurality of LEDs (light emitting diodes) 2a provided on a side face of the light guide plate 2b, and the like, for example. The light source module 2 is a surface light-emitting unit that radiates blue light BL towards the light shutter 3. The light source module 2 is not limited to an edge-lit backlight like the one described above. The light source module 2 may be a direct-lit type provided with a plurality of the LEDs 2a arranged in an array, for example. The wavelength region of the blue light BL is 390 nm to 510 nm, for example. The wavelength in which the intensity of the blue light BL is highest is approximately 450 nm, for example.

The light shutter 3 selectively allows the blue light BL emitted from the light source module 2 to enter the color conversion substrate 4 while blocking light other than this blue light BL. As for the light shutter 3, an example using liquid crystal is described, but MEMS may also be used as the light shutter 3.

The light shutter 3 includes a TFT (thin film transistor) substrate 5 disposed towards the light source module 2, an opposite substrate 6 disposed farther towards the opposite side of the light source module 2 than the TFT substrate 5, a liquid crystal layer 7 sealed between the TFT substrate 5 and the opposite substrate 6, and a sealing member 8 that seals the liquid crystal layer 7.

The TFT substrate 5 includes a transparent substrate 10 such as a glass substrate, a polarizing plate 11 formed on the transparent substrate 10 on a main surface thereof that faces the light source module 2, a plurality of thin film transistors 13 formed on the transparent substrate 10 on a main surface thereof on an opposite side to the main surface where the polarizing plate 11 is formed, an interlayer insulating film 14 formed so as to cover the thin film transistors 13, a pixel electrode 15 formed on the interlayer insulating film 14, and an alignment film 16 that is formed so as to cover the pixel electrode 15.

Each of the thin film transistors 13 includes a gate electrode 20 formed on a main surface of the transparent substrate 10, a gate insulating film 12 formed so as to cover the gate electrode 20, a semiconductor layer 21 formed on the gate insulating film 12, and a source electrode 22 and a drain electrode 23 formed so as to have a gap therebetween on a semiconductor layer 21.

The pixel electrode 15 is formed of a transparent conductive film such as an ITO (indium tin oxide) film, an IZO (indium zinc oxide) film, or the like, for example. The pixel electrode 15 is connected to the drain electrode 23 by a contact (not shown). Thus, when the thin film transistor 13 is in an ON state, a prescribed voltage is applied to the pixel electrode 15.

A plurality of thin film transistors 13 are provided, and in the example shown in FIG. 1, thin film transistors 13R, 13G, and 13B are provided. A plurality of each thin film transistor 13R, 13F, and 13B are provided.

Furthermore, the thin film transistors 13R, 13G, and 13B are respectively connected to pixel electrodes 15R, 15G, and 15B.

The gate insulating film 12 and the interlayer insulating film 14 are transparent insulating films similar to a silicon oxide film, a silicon nitride film, or the like. The alignment film 16 is formed of a polyimide film or the like, and a rubbing treatment is performed on the surface thereof so that the orientation of the liquid crystal molecules can be controlled. The liquid crystal layer 7 includes a plurality of liquid crystal molecules.

The opposite substrate 6 includes a glass substrate 30 formed of glass or the like, a common electrode 31 formed on the glass substrate 30 on a main surface thereof that faces the TFT substrate 5, an alignment film 32 formed so as to cover the common electrode 31, and a polarizing plate 33 formed on a main surface that faces the color conversion substrate 4. The sealing member 8 is formed along the periphery of the TFT substrate 5 and the opposite substrate 6 in a loop shape, and the liquid crystal layer 7 is sealed between the opposite substrate 6 and the TFT substrate 5.

The color conversion substrate 4 includes a main plate 39 and a phosphor layer 42 formed on a main surface of the main plate 39 that faces the light shutter 3. The main plate 39 includes a transparent substrate 40 and a low refractive index film 41 formed on the main surface of the transparent substrate 40. The transparent substrate 40 is a glass substrate, or the like, for example. The refractive index of the low refractive index film 41 is 1.20 to 1.40.

The phosphor layer 42 includes a light scattering member 44, phosphors 45, a resin layer 43 covering the light scattering member 44 and the phosphors 45, and a reflective member 46 formed on a resin layer 43. The phosphors 45 include a red phosphor 45R and a green phosphor 45G. The red phosphor 45R, the green phosphor 45G, and the light scattering member 44 are disposed so as to have a gap therebetween.

The refractive index of the red phosphor 45R and the green phosphor 45G are approximately 1.49 to 1.59. The red phosphor 45R and the green phosphor 45G are formed of an organic phosphor material, a nanophosphor material, or the like. Examples of the organic phosphor materials include a rhodamine pigment such as rhodamine B that is a red fluorescent pigment, a coumarin pigment such as coumarin 6 that is a green fluorescent pigment, or the like. The nanophosphor material includes a binder and a plurality of phosphors diffused in the binder. The binder is formed of a resin such as a transparent silicone type, an epoxy type, or an acrylic type, for example. CdSe, ZnS, or the like that is a nanoparticle phosphor can be used as the phosphor, for example.

By forming the red phosphor 45R using a material mentioned above, the red phosphor 45R can transmit red light (light with a wavelength region of 530 nm to 690 nm). As a result, the light emitted by exciting the red phosphor 45R can pass through the red phosphor 45R, and thus an improvement in light use efficiency of the light emitted by the red phosphor 45R is possible.

In a similar manner, the green phosphor 45G can allow green light to pass through and the light emitted by exciting the green phosphor 45G can pass through the green phosphor 45G, and thus an improvement in light use efficiency of the light emitted by the green phosphor 45G is possible.

The light scattering member 44 is a layer that diffuses light entering therein and then emits the light outside. The light scattering member 44 has a transparent resin as a binder and a plurality of scattering particles that are scattered in the resin. The transparent resin that is a binder allows blue light BL to pass through and allows the light use efficiency to be improved.

The resin layer 43 is formed of a transparent resin material. The resin layer 43 is formed so as to protrude farther towards the light shutter 3 than the light scattering member 44 and the phosphors 45. The reflective member 46 is formed so as to cover the surface of the resin layer 43 and to be in contact with a top face of the light shutter 3.

As a result, an air layer 48 is formed between the light shutter 3, the light scattering member 44, and the phosphors 45. In other words, the reflective member 46 and the resin layer 43 function as a spacer 47 forming the air layer 48 between the light shutter 3, the red phosphor 45R, the green phosphor 45G, and the light scattering member 44.

Figure 2:
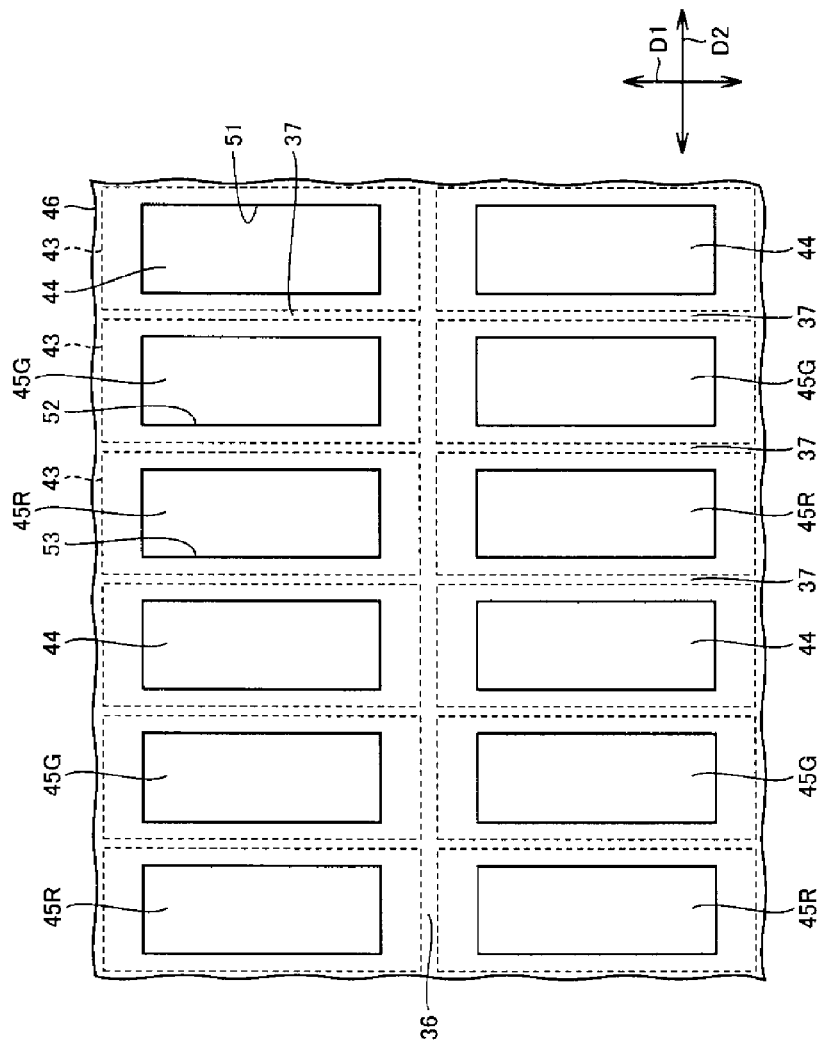
FIG. 2 is a plan view of a color conversion substrate 4, and is a plan view of the color conversion substrate 4 seen from a light shutter 3 side.

FIG. 2 is a plan view of the color conversion substrate 4 seen from the light shutter 3 side. As shown in FIG. 2, the light scattering member 44, the green phosphor 45G, and the red phosphor 45R are arranged in an array. Specifically, the red phosphor 45R, the green phosphor 45G, and the light scattering member 44 are disposed one after another along an array direction D2 with gaps therebetween. Then, a plurality of the red phosphors 45R are disposed along the array direction D1 so as to have a gap therebetween. Similarly, a plurality of the green phosphors 45G are disposed along the array direction D1 so as to have a gap therebetween, and a plurality of light scattering members 44 are disposed along the array direction D1 so as to have a gap therebetween.

Figure 3:
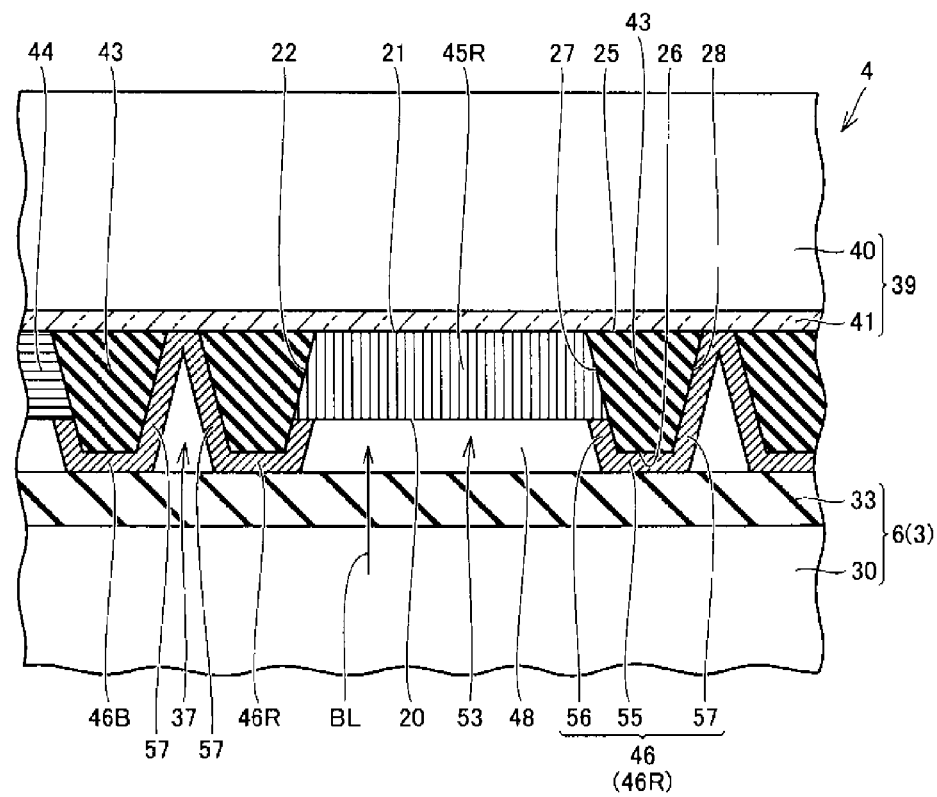
FIG. 3 is a cross-sectional view of a periphery of a red phosphor 45R.

FIG. 3 shows a cross-sectional view of a periphery of a red phosphor 45R. As shown in FIG. 3, the red phosphor 45R has a receiving surface 20 that receives the blue light BL from the light shutter 3, an emitting surface 21 facing the transparent substrate 40, and a side face 22 located between the receiving surface 20 and the emitting surface 21.

As shown in FIG. 2, the resin layer 43 is formed in a loop shape so as to surround the red phosphor 45R. In FIG. 3, the resin layer 43 is disposed on a bottom face of the low refractive index film 41, the resin layer 43 being formed on the side face 22 so as to surround the red phosphor 45R, the green phosphor 45G, or the light scattering member 44.

The resin layer 43 includes a top face 25 that is in contact with the low refractive index film 41, a bottom face 26 located towards the opposite substrate 6, an inner surface 27 that is in contact with the side face 22 of the red phosphor 45R, and an outer surface 28.

The reflective member 46 includes a bottom face portion 55 formed on the bottom face 26 of the resin layer 43, an inner wall 56 formed on the inner surface 27, and an outer wall 57 formed on the outer surface 28.

The inner wall 56 is formed in a loop shape, and the inner wall 56 forms an opening 53 that permits the blue light BL to enter the red phosphor 45R. Similarly, in FIG. 2, an opening 51 is formed in the light scattering member 44 that permits the blue light BL to enter, and an opening 52 is formed in the green phosphor 45G that permits the blue light BL to enter.

In FIG. 3, the resin layer 43 is formed so as to surround the light scattering member 44, and a reflective member 46B is formed on this resin layer 43. Furthermore, the resin layer 43 is also formed around the red phosphor 45R, and on this resin layer 43, a reflective member 46R is formed.

Figure 4:
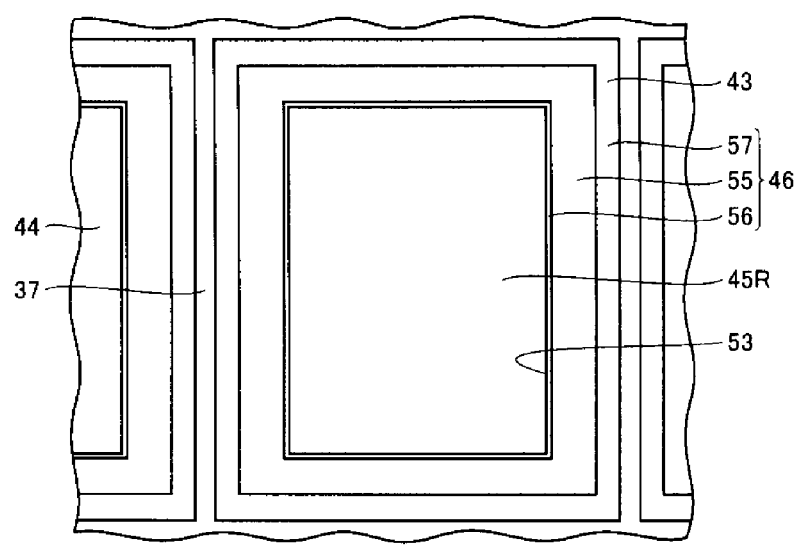
FIG. 4 is a plan view showing a configuration of the red phosphor 45R and the periphery thereof.

A groove 37 is formed between the outer wall 57 of the reflective member 46B and the outer wall 57 of the reflective member 46R. FIG. 4 is a plan view of the configuration of the red phosphor 45R and the surrounding thereof, and as shown in FIG. 4, the groove 37 that extends along the light scattering member 44 and the red phosphor 45R is formed therebetween.

In FIG. 2, the groove 37 is also formed between the green phosphor 45G and the red phosphor 45R, and is also formed between the light scattering member 44 and the green phosphor 45G. This groove 37 is formed so as to extend along the array direction D1.

Furthermore, as shown in FIG. 2, a groove 36 that intersects with this groove 37 is formed on the color conversion substrate 4 so as to extend in the array direction D2. This groove 36 passes through the space between the red phosphors 45R that are disposed in the array direction D1, the space between the green phosphors 45G, and the space between the light scattering members 44.

The driving of the display device 1 with this type of configuration is described. In FIG. 1, the blue light BL from the light source module 2 enters the light shutter 3. The light shutter 3 selectively emits the blue light BL that enters the color conversion substrate 4. Specifically, when the selected thin film transistor 13 is ON, only the blue light BL passing through the pixel electrode 15 connected to the selected thin film transistor 13 travels through the polarizing plate 33 and enters the color conversion substrate 4.

Figure 5:
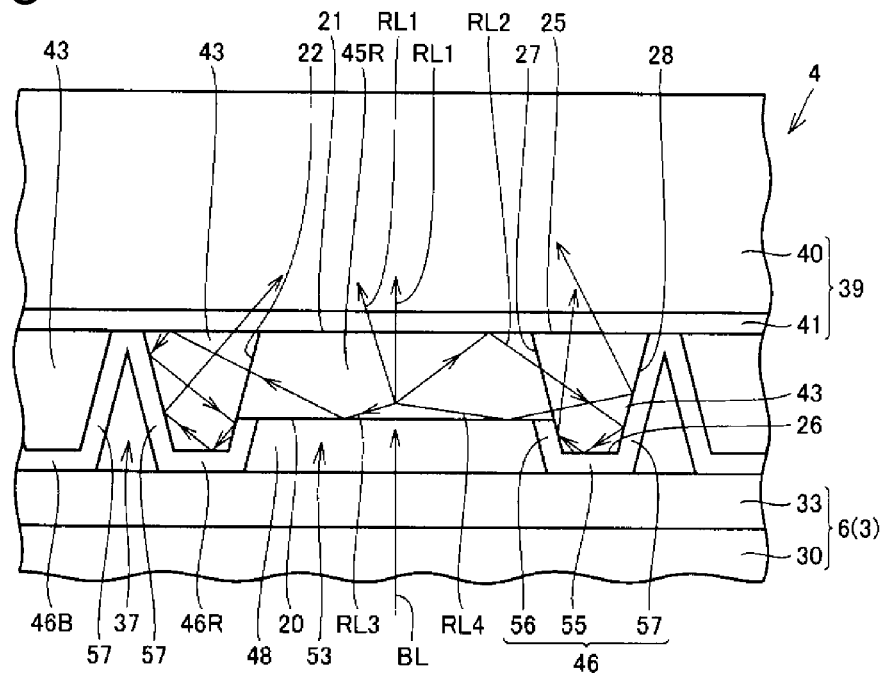
FIG. 5 is a cross-sectional view showing a state in which a blue light BL enters the red phosphor 45R.

FIG. 5 is a cross-sectional view showing a state in which the blue light BL enters the red phosphor 45R. The red phosphor 45R is excited when the blue light BL enters and emits red light RL in a radial manner.

Here, the refractive index of the low refractive index film 41 is lower than the refractive index of the red phosphor 45R. Therefore, red light RL1 that enters the low refractive index film 41 with a smaller incident angle than the critical angle of the interface between the low refractive index film 41 and the red phosphor 45R enters the main plate 39.

On the other hand, the red light RL that enters with a greater incident angle than the above-mentioned critical angle is reflected by the interface between the red phosphor 45R and the low refractive index film 41. Red light RL2 shown in FIG. 5 is reflected by the interface between the low refractive index film 41 and the red phosphor 45R, for example. The red light RL2 enters the resin layer 43 from the side face of the red phosphor 45R.

Then, the red light RL2 is reflected by the reflective member 46 and enters the low refractive index film 41 again. At this point, the incident angle of the red light RL2 entering the low refractive index film 41 is smaller than the critical angle and the red light RL2 enters the main plate 39.

Furthermore, a portion of the red light RL1 emitted in a radial manner travels towards the receiving surface 20. Red light RL3 and RL4 travel towards the receiving surface 20, for example. Here, the receiving surface 20 is exposed to the air layer 48. The refractive index of the air layer 48 is 1.0 and the refractive index of the red phosphor 45R is greater than the refractive index of air.

Therefore, if the incident angle of the red light RL3 and RL4 is greater than the critical angle of the interface between the air layer 48 and the red phosphor 45R, the red light RL3 and RL4 are reflected. As a result, the red light RL emitted by the red phosphor 45R can be suppressed from being emitted towards the light shutter 3. Following this, an improvement in light use efficiency can be attained. After the red light RL4 is reflected by the interface between the red phosphor 45R and the air layer 48, the red light RL4 is reflected by the reflective member 46. The red light RL4 reflected by the reflective member 46 enters the interface between the red phosphor 45R and the low refractive index film 41. During this time, the incident angle of the red light RL4 is smaller than the critical angle of the interface between the low refractive index film 41 and the red phosphor 45R, and the red light RL4 enters the main plate 39. Then, the red light RL4 is emitted outside from the emitting surface of the transparent substrate 40. When the red light RL3 is reflected by the interface between the red phosphor 45R and the air layer 48, the red light RL3 travels towards the light emitting surface 21.

During this time, if the incident angle to the interface between the low refractive index film 41 and the red phosphor 45R is greater than the critical angle, the red light RL3 is reflected by the interface between the low refractive index film 41 and the red phosphor 45R. Then, the red light RL3 is reflected by the reflective member 46 and enters the interface between the low refractive index film 41 and the red phosphor 45R again. Because the incident angle here is smaller than the critical angle, the red light RL3 passes through the low refractive index film 41. In addition, the red light that reaches the reflective member 46 after being reflected between the receiving surface 20 and the emitting surface 21 a plurality of times also passes through the low refractive index film 41. In this manner, an improvement in use efficiency of the red light RL that is emitted can be achieved by having the reflective member 46 reflect the red light RL that has been reflected by the interface between the red phosphor 45R and the air layer 48.

Furthermore, because the reflective member 46 includes the inner wall 56, the bottom face portion 55, and the outer wall 57, light that enters into the resin layer 43 can be suppressed from leaking to the light shutter 3. Because the outer wall 57 reflects the red light RL, the red light RL can be suppressed from entering the adjacent green phosphor 45G or the like.

Figure 6:
FIG. 6 is a cross-sectional view showing a first step of a manufacturing process of the color conversion substrate 4 according to Embodiment 1.

The method of manufacturing the color conversion substrate 4 having a configuration similar to the configuration mentioned above will be described. FIG. 6 is a cross-sectional view showing a first step of a manufacturing process of the color conversion substrate 4 according to Embodiment 1. As shown in FIG. 6, first, the transparent substrate 40 is prepared.

Then, the low refractive index film 41 is formed on the main surface of the transparent substrate 40 using a spin coater, a slit coater, or the like.

The film thickness of the low refractive index film 41 is approximately 0.5 μm to 3 μm, for example, and is preferably approximately 1 μm.

Figure 7:
FIG. 7 is a cross-sectional view showing a second step of the manufacturing process of the color conversion substrate 4.

FIG. 7 is a cross-sectional view showing a second step of the manufacturing process of the color conversion substrate 4. In FIG. 7, the transparent resin is formed on the top face of the low refractive index film 41 with the spin coating method or the like. Then, the resin layer 43 is formed on the low refractive index film 41 by performing photolithography on the transparent resin film.

Figure 8:
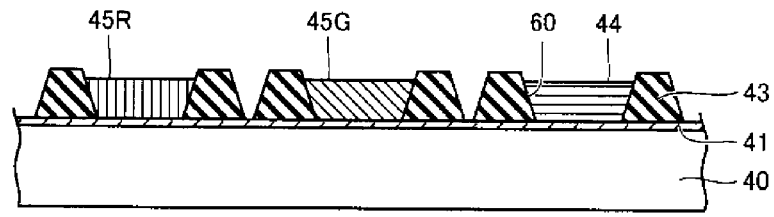
FIG. 8 is a cross-sectional view showing a third step of the manufacturing process of the color conversion substrate 4.

FIG. 8 is a cross-sectional view showing a third step of the manufacturing process of the color conversion substrate 4. In FIG. 8, a phosphor material and a light scattering material are applied using an inkjet printing method. A plurality of holes 60 are formed by the resin layers 43, and the phosphor material and the light scattering material are applied to the respective holes 60. Then, the red phosphor 45R, the green phosphor 45G, and the light scattering member 44 are formed by applying a baking treatment to the phosphor material and the light scattering material. By adjusting the amount of phosphor material and light scattering material applied, the red phosphor 45R, the green phosphor 45G, and the light scattering member 44 are positioned such that the top face of the light scattering member 44 is in a lower position than the top face of the resin layer 43.

The film thickness of the red phosphor 45R and the green phosphor 45G is 2 μm to 10 μm, for example. It is preferable that the film thickness of the red phosphor 45R and the green phosphor 45G be 5 μm to 8 μm. The film thickness of the light scattering member 44 is 3 μm to 10 μm, for example. It is preferable that the film thickness of the light scattering member 44 be 5 μm to 8 μm.

Figure 9:
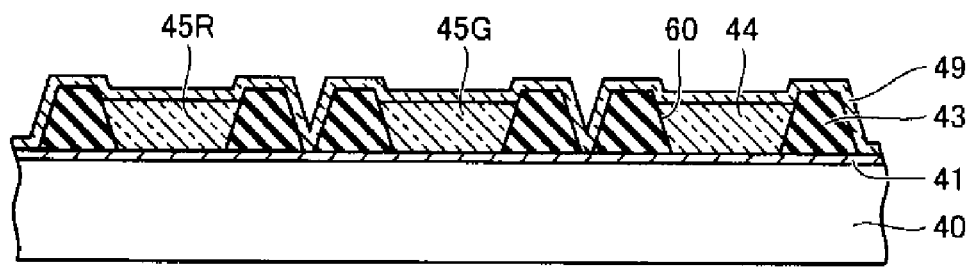
FIG. 9 is a cross-sectional view showing a fourth step of the manufacturing process of the color conversion substrate 4.

FIG. 9 is a cross-sectional view showing a fourth step of the manufacturing process of the color conversion substrate 4. In FIG. 9, a transparent inorganic film 49 is formed so as to cover the resin layer 43, the red phosphor 45R, the green phosphor 45G, and the light scattering member 44. The transparent inorganic film 49 is formed by sputtering or vapor deposition, for example. The transparent inorganic film 49 is formed of a transparent inorganic material such as a silicon oxide film ($SiO^2$), a silicon nitride film (SiN), or the like, for example. The film thickness of a transparent inorganic film 49 is 100 nm to 500 nm, for example.

Figure 10:
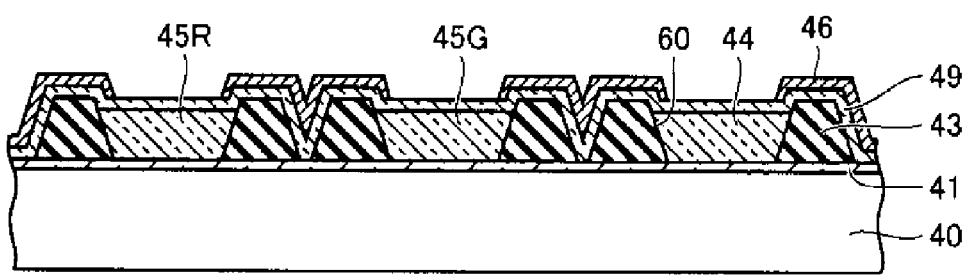
FIG. 10 is a cross-sectional view showing a fifth step of the manufacturing process of the color conversion substrate 4.

FIG. 10 is a cross-sectional view showing a fifth step of the manufacturing process of the color conversion substrate 4. In FIG. 10, a metal film of aluminum (Al), silver (Ag), or the like is formed on the top face of the transparent inorganic film 49 by sputtering or vapor deposition. Then, a resist is formed on the top face of the metal film. The reflective member 46 is formed by using this resist to pattern the metal film. After the reflective member 46 is formed, the color conversion substrate 4 of Embodiment 1 can be formed by removing the resist.

When the color conversion substrate 4 is manufactured, a plurality of the color conversion substrates 4 may be simultaneously formed on the main surface of a wide mother glass substrate. In this case, a plurality of the color conversion substrates 4 that is formed on the mother glass substrate are cut into respective color conversion substrates 4.

Then, as shown in FIG. 1, the light source module 2, the light shutter 3, and the color conversion substrate 4 are layered one after another to manufacture the display device 1 according to Embodiment 1.

Embodiment 2

A display device 1 according to Embodiment 2 will be described with reference to FIGS. 11 to 22. Of the configurations shown in FIGS. 11 to 22, configurations that are the same or correspond to those in FIGS. 1 to 10 above may be assigned the same reference characters with descriptions thereof being omitted.

Figure 11:
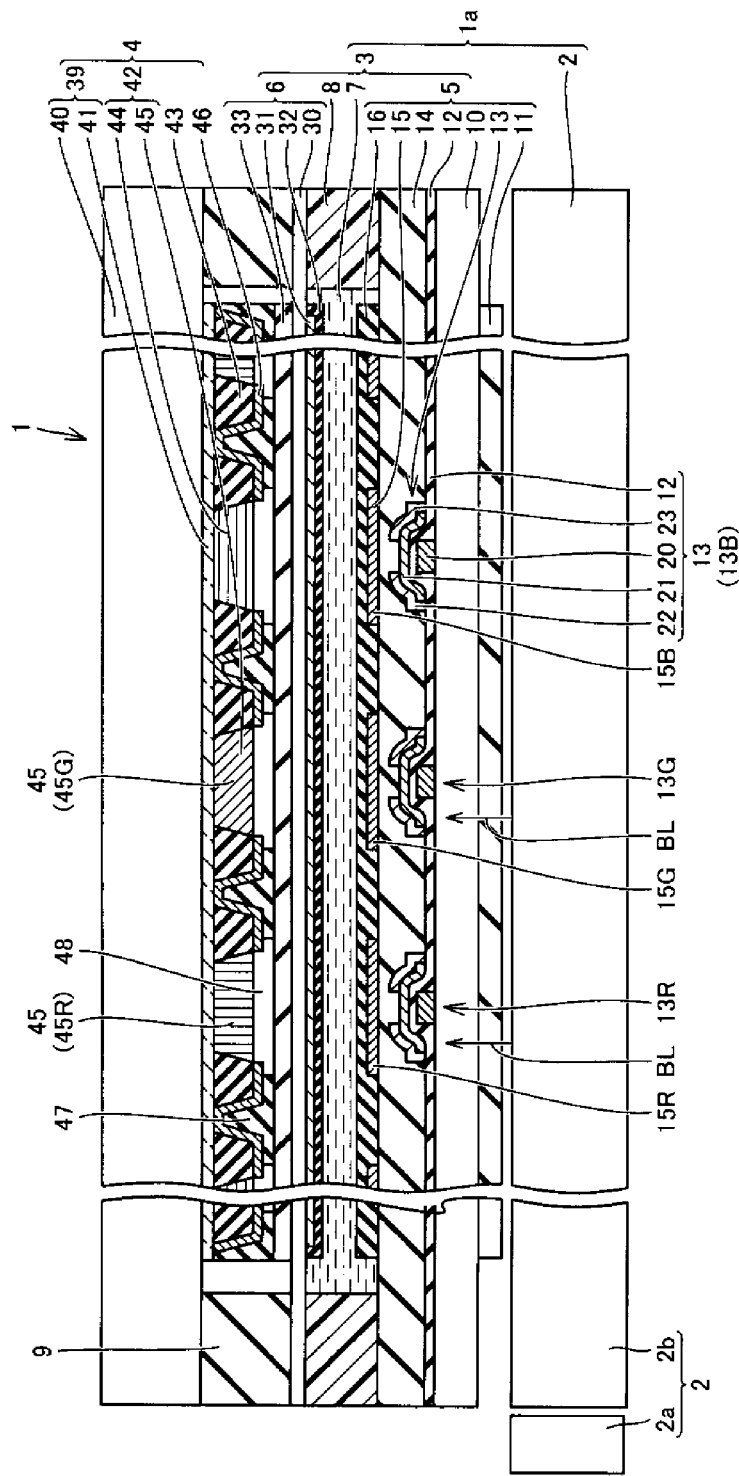
FIG. 11 is a cross-sectional view of a display device 1 according to Embodiment 2.

FIG. 11 is a cross-sectional view of the display device 1 according to Embodiment 2. As shown in FIG. 11, the display device 1 includes a light source unit 1*a*, a spacer 47 disposed on the light source unit 1*a*, and a color conversion substrate 4 supported by the spacer 47.

The color conversion substrate 4 is disposed at a distance from a light shutter 3 due to the spacer 47. As a result, an air layer 48 is formed between a red phosphor 45R and the light shutter 3, between a green phosphor 45G and the light shutter 3, and between a light scattering member 44 and the light shutter 3.

Figure 12:
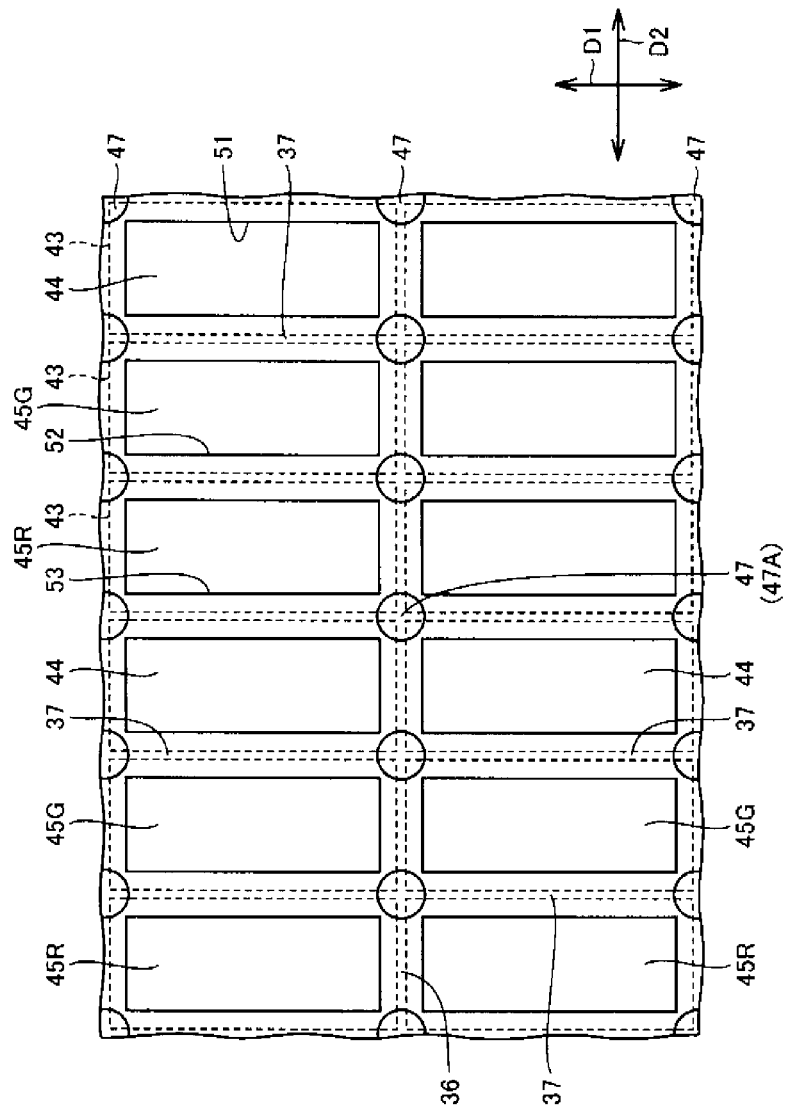
FIG. 12 is a plan view showing a color conversion substrate 4.

FIG. 12 is a plan view showing the color conversion substrate 4. FIG. 12 is a plan view of the color conversion substrate 4 seen from the light shutter 3 side.

As shown in FIG. 12, a resin layer 43 is formed in a loop shape so as to surround the light scattering member 44, the red phosphor 45R, and the green phosphor 45G.

The resin layer 43 is formed so as to have a rectangular frame shape in the example shown in FIG. 12. The spacer 47 is disposed in the corner portion of the resin layer 43. Specifically, the spacer 47 is disposed in the portion where a groove 36 intersects with another groove 37. Here, the focus will be on a spacer 47A shown in FIG. 12. This spacer 47A is disposed so as to cover a corner portion of the resin layer 43 that surrounds one light scattering member 44, a corner portion of the resin layer 43 that surrounds another light scattering member 44 adjacent to the previous light scattering member 44, a corner portion of the resin layer 43 that surrounds one red phosphor 45R, and a corner portion of the resin layer 43 that surrounds another red phosphor 45R that is adjacent to the previous red phosphor 45R. Other spacers 47 are disposed in a similar manner. The respective spacers 47 are disposed away from openings 51, 52, and 53. As a result, the spacer 47 suppresses blue light BL that enters the color conversion substrate 4 from the light shutter 3.

In the present embodiment, the spacer 47 is formed in a cylindrical shape. Of course, the shape of the spacer 47 may be other shapes such as a rectangular columnar shape or a polygonal columnar shape.

Figure 13:
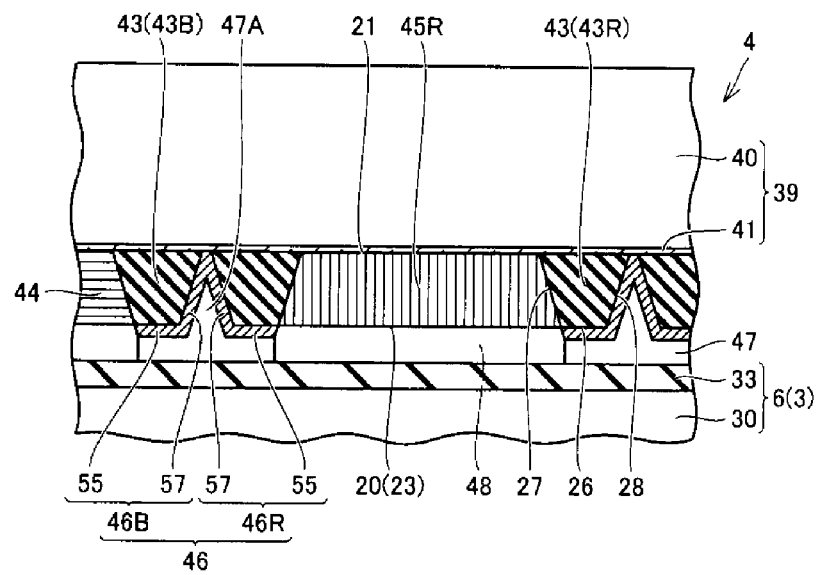
FIG. 13 is a cross-sectional view of a red phosphor 45R and the periphery thereof.
Figure 14:
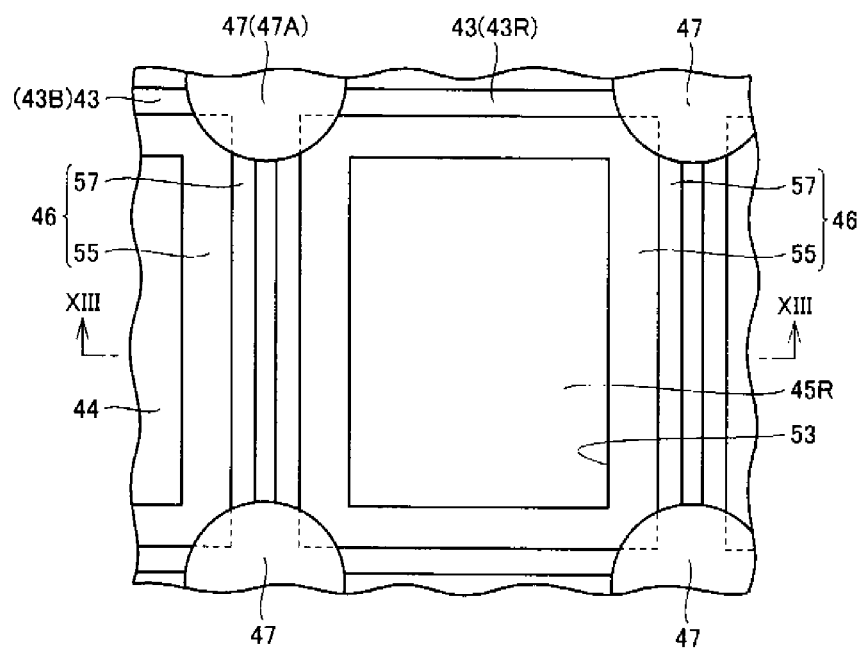
FIG. 14 is a plan view showing the red phosphor 45R and the periphery thereof.

FIG. 13 is a cross-sectional view of the red phosphor 45R and the surrounding thereof, and FIG. 14 is a plan view showing the red phosphor 45R and the surrounding portion thereof.

In FIGS. 13 and 14, the color conversion substrate 4 includes a resin layer 43B surrounding the light scattering member 44 and a resin layer 43R surrounding the red phosphor 45R.

The reflective member 46 includes a reflective member 46R that covers the resin layer 43R and a reflective member 46B that covers the resin layer 43B.

The reflective member 46R and the reflective member 46B both include a bottom face portion 55 and an outer wall 57. The bottom face portion 55 of the reflective member 46R is formed so as to cover a bottom face 26 of the resin layer 43R and the outer wall 57 is formed so as to cover an outer face 28 of the resin layer 43R. The bottom face portion 55 of the reflective member 46B is formed so as to cover a bottom face 26 of the resin layer 43B and the outer wall 57 is formed so as to cover an outer face 28 of the resin layer 43G.

The spacer 47A supports the bottom face portion 55 and the outer wall 57 of the reflective members 46B and 46R. As a result, the air layer 48 is formed between the red phosphor 45R and the light shutter 3. Thus, in the display device 1 of Embodiment 2, red light RL can also be suppressed from being emitted towards the light shutter 3 even if the red phosphor 45R emits light and the red light RL is emitted in a radial manner.

Furthermore, in FIG. 11, the air layer 48 is formed between the green phosphor 45G and the light shutter 3, and between the light scattering member 44 and the light shutter 3. Due to this, even if the green phosphor 45G emits light and the green light is emitted in a radial manner, the green light can be suppressed from being emitted to the light shutter 3.

Furthermore, in the light scattering member 44, even if the blue light BL enters the light scattering member 44 and scatters, the scattered blue light BL can also be suppressed from being emitted to the light shutter 3 from the light scattering member 44.

Furthermore, the spacer 47 is formed between the reflective member 46 and the light shutter 3, and the spacer 47 is suppressed from blocking the blue light BL emitted to the red phosphor 45R, the green phosphor 45G, and the light scattering member 44 from the light shutter 3.

Figure 15:
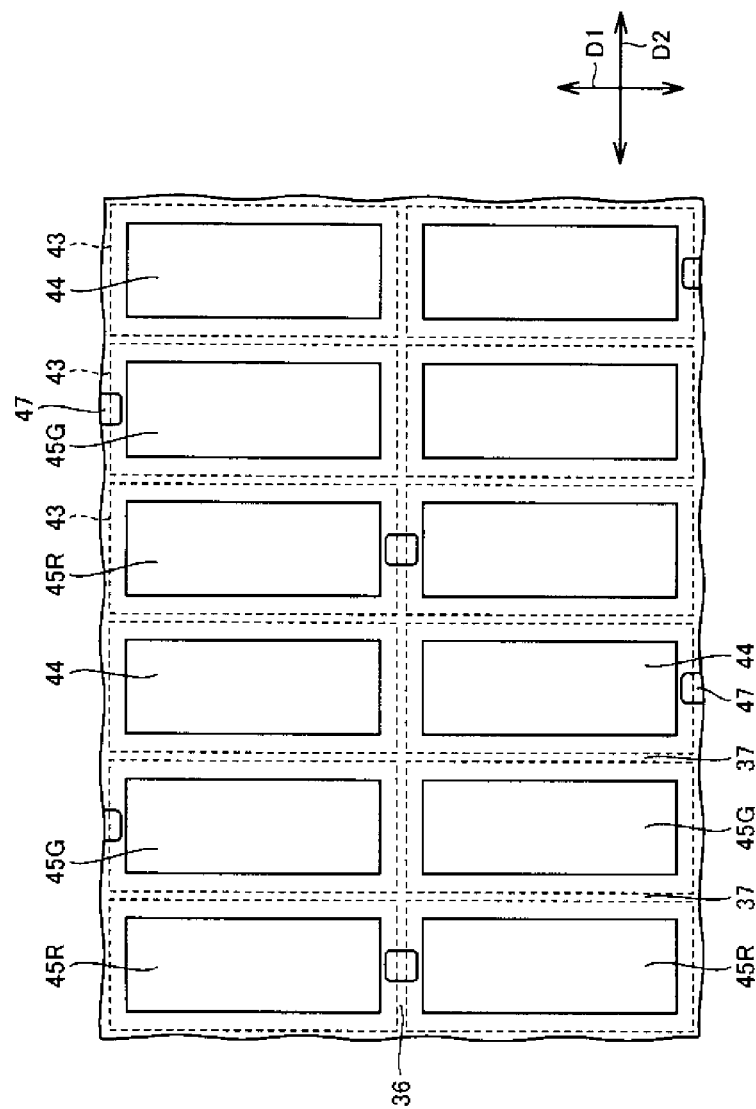
FIG. 15 is a plan view showing a first modification example of a color conversion substrate 4 mounted on the display device 1 of Embodiment 2.

FIG. 15 is a plan view showing a first modification example of a color conversion substrate 4 provided in the display device 1 according to Embodiment 2. As shown in FIG. 15, the position of the spacer 47 is not limited to the position shown in FIG. 12. As shown in FIG. 15, the spacer 47 may be disposed dispersedly.

The spacers 47 are disposed in the groove 36 so as to have a gap therebetween. When the spacer 47 shown in FIG. 15 is seen in a plan view, the spacer 47 is formed so as to have a rectangular shape.

Figure 16:
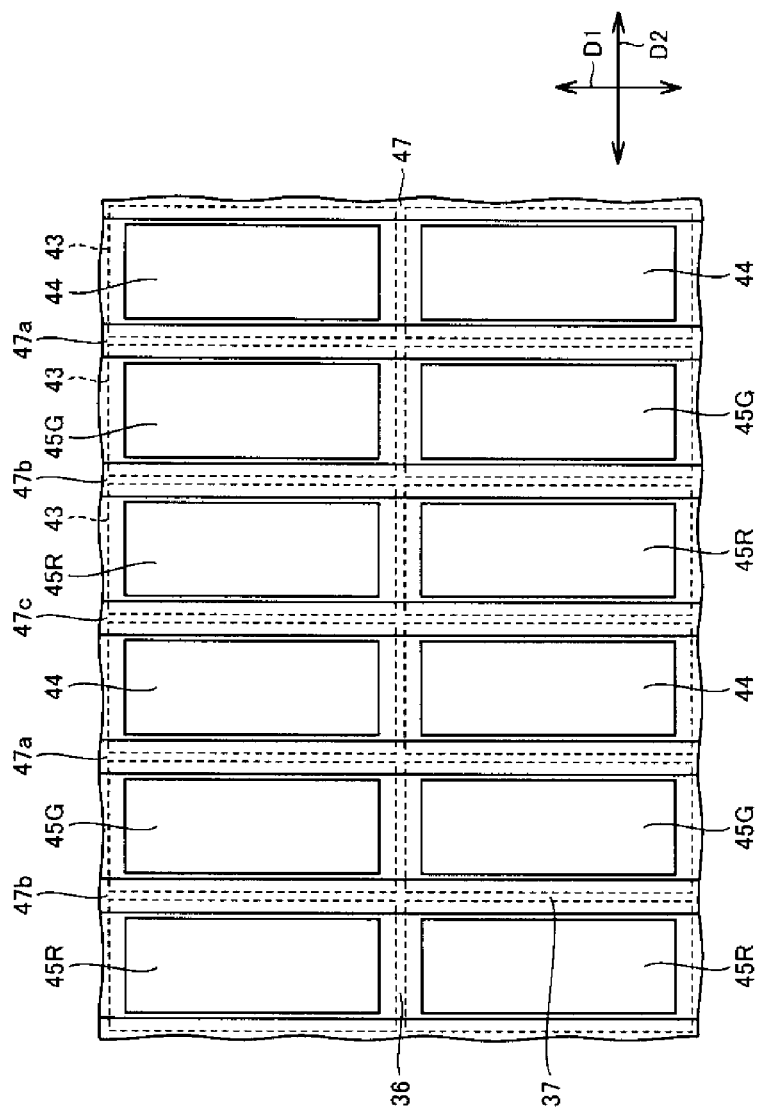
FIG. 16 is a plan view showing a second modification example of the color conversion substrate 4.

FIG. 16 is a plan view showing a second modification example of the color conversion substrate 4. The color conversion substrate 4 shown in FIG. 16 includes a plurality of spacers 47 extending in an array direction D1. Specifically, the color conversion substrate 4 includes a spacer 47a formed in the groove 37 positioned between the green phosphor 45G and the light scattering member 44, a spacer 47b formed in the groove 36 positioned between the green phosphor 45G and the red phosphor 45R, and a spacer 47c formed in the groove 37 positioned between the red phosphor 45R and the light scattering member 44. The spacer 47a, the spacer 47b, and the spacer 47c are all formed so as to extend in the array direction D1.

Here, the respective spacers 47a, 47b, and 47c are formed of a resin material having light-shielding characteristics. Due to this, in FIG. 13, even if the light emitted from the red phosphor 45R leaks towards a polarizing plate 33, the spacer 47 prevents the leaking light from spreading to the surrounding area.

As a result, light from the red phosphor 45R can be suppressed from entering the green phosphor 45G and the light scattering member 44.

Figure 17:
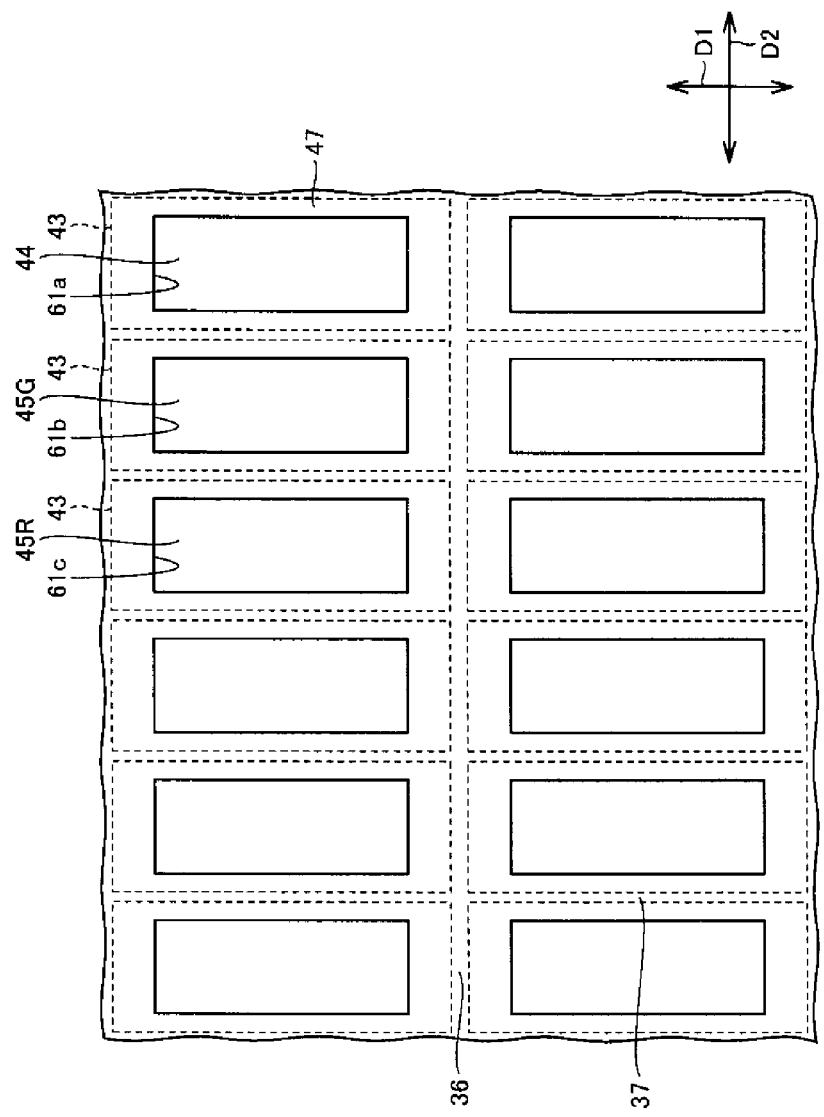
FIG. 17 is a plan view showing a third modification example of the color conversion substrate 4.

FIG. 17 is a plan view showing a third modification example of the color conversion substrate 4. As shown in FIG. 17, the spacer 47 is formed so as to cover substantially the entire surface of the bottom face of the color conversion substrate 4. The spacer 47 has an opening 61a that exposes the receiving surface of the light scattering member 44, an opening 61b that exposes the receiving surface of the green phosphor 45G to the outside, and an opening 61c that exposes the receiving surface of the red phosphor 45R. In this manner, the spacer 47 is formed so as to bury the groove 36 and the groove 37 shown in FIG. 2.

Figure 18:
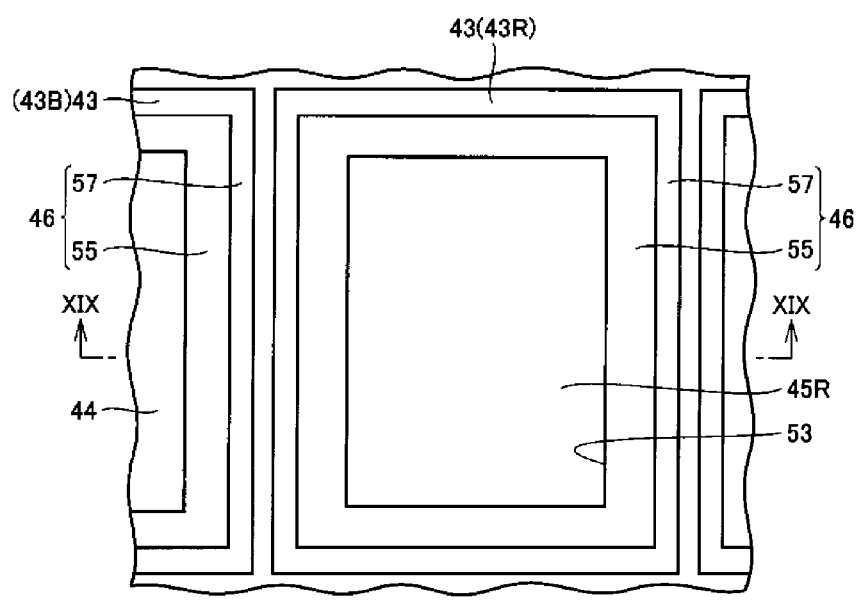
FIG. 18 is a plan view of the red phosphor 45R and the periphery thereof.
Figure 19:
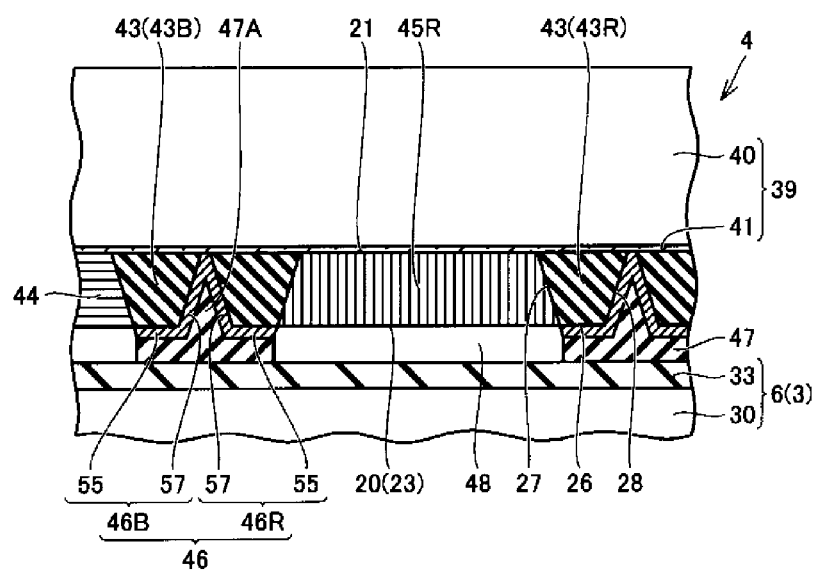
FIG. 19 is a cross-sectional view of FIG. 18 along the line XIX-XIX.

FIG. 18 is a plan view showing the red phosphor 45R and the surrounding thereof, and FIG. 19 is a cross-sectional view of FIG. 18 along the line XIX-XIX. As shown in FIG. 18, the spacer 47 is formed so as to surround the receiving surface 20 of the red phosphor 45R. Therefore, in FIG. 19, even if the red light RL emitted from the red phosphor 45R leaks towards the polarizing plate 33, the red light RL that is leaking can be suppressed from leaking to the surrounding area of the red phosphor 45R.

Specifically, in FIG. 17, the leaked red light RL is suppressed from entering the green phosphor 45G and the light scattering member 44 that are adjacent to the red phosphor 45R in an array direction D2. Furthermore, the leaked red light RL can also be suppressed from entering another red phosphor 45R that is adjacent to the red phosphor 45R in the array direction D1.

As shown in FIG. 17, the air layer 48 formed between the color conversion substrate 4 and the light shutter 3 is sealed by the spacer 47. Due to this, even if pressure is applied to the display device 1, the air in the air layer 48 suppresses the red light RL from leaking to the outside from between the light shutter 3 and the color conversion substrate 4.

Figure 20:
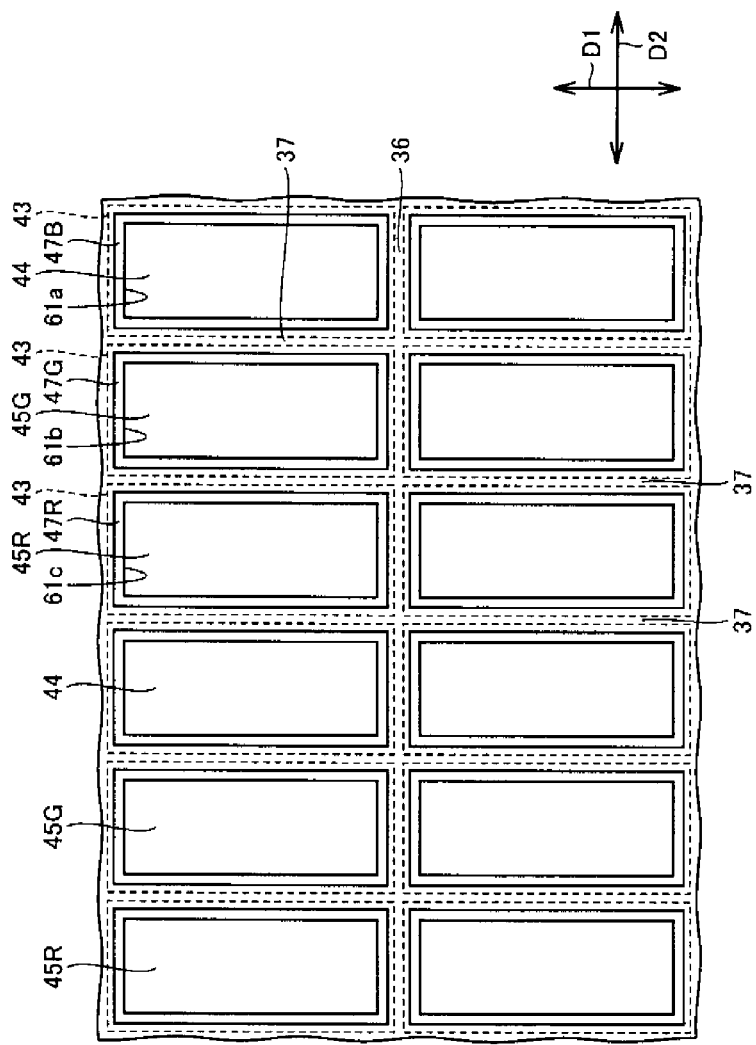
FIG. 20 is a plan view showing a fourth modification example of the color conversion substrate 4 according to Embodiment 2.
Figure 21:
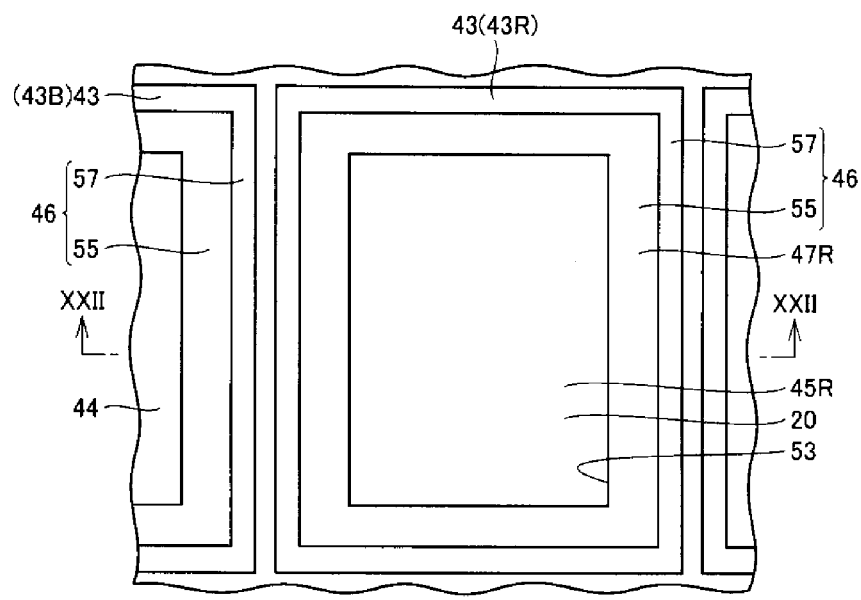
FIG. 21 is a plan view showing the red phosphor 45R and the periphery thereof.
Figure 22:
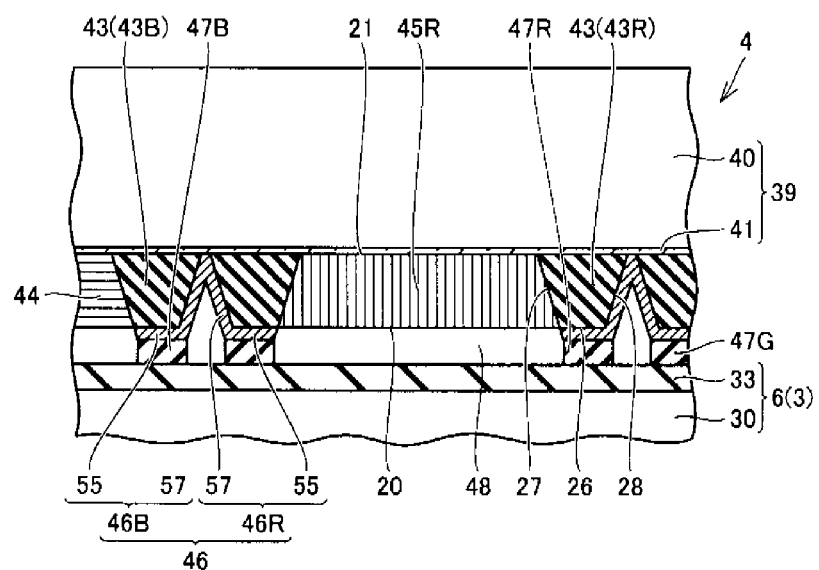
FIG. 22 is a cross-sectional view of FIG. 21 along the line XXII-XXII.

FIG. 20 is a plan view showing a fourth modification example of the color conversion substrate 4 related to Embodiment 2. In the example shown in FIG. 20, the light shutter 3 includes a plurality of spacers 47R, a plurality of spacers 47G, and a plurality of spacers 47B. The spacers 47R, 47G, and 47B are respectively disposed so as to have gaps therebetween. FIG. 21 is a plan view showing the red phosphor 45R and the periphery thereof. FIG. 22 is a cross-sectional view of FIG. 21 along the line XXII-XXII.

In FIG. 21, if the receiving surface 20 and the spacer 47R are seen in a direction perpendicular to the main surface of the transparent substrate 40 from a position at a distance from the color conversion substrate 4, the spacer 47R is formed along the periphery of the receiving surface 20 of the red phosphor 45R in a loop shape. As shown in FIG. 22, the spacer 47R is formed on the bottom face portion 55 of the reflective member 46R. Furthermore, the spacer 47R is disposed between the bottom face portion 55 of the reflective member 46R and the light shutter 3.

In a similar manner, as shown in FIG. 20, the spacer 47G is formed in a loop shape that extends along the periphery of the receiving surface of the green phosphor 45G. The spacer 47B is formed in a loop shape that extends along the periphery of the receiving surface of the light scattering member 44.

As a result, in FIG. 22, when the red phosphor 45R emits the red light RL in a radial manner, even if the red light RL leaks towards the light shutter 3, the red light RL is suppressed from entering the adjacent green phosphor 45G and the light scattering member 44.

Furthermore, according to FIG. 20, the red light RL is suppressed from entering another red phosphor 45R that is adjacent to the red phosphor 45R.

In a similar manner, even if the green light leaks from the green phosphor 45G towards the light shutter 3, the light that leaked can be suppressed from entering the red phosphor 45R and the light scattering member 44, and can be suppressed from entering another green phosphor 45G.

Furthermore, as for the light scattering member 44, even if the blue light BL diffused by the light scattering member 44 leaks towards the light shutter 3, the blue light BL can be suppressed from entering another green phosphor 45G, another red phosphor 45R, or both, and also suppress the blue light BL from entering another light scattering member 44.

As shown in FIG. 20, the respective spacers 47R, 47B, and 47G are disposed so as to have a gap therebetween, and thus, if one spacer is damaged by having a crack or the like, such damage is suppressed from affecting other spacers.

Embodiment 3

A display device 1 according to Embodiment 3 will be described with reference to FIGS. 23 to 34. Of the configurations shown in FIGS. 23 to 34, configurations that are the same or correspond to those of FIGS. 1 to 22 above may be assigned the same reference characters with descriptions thereof being omitted.

Figure 23:
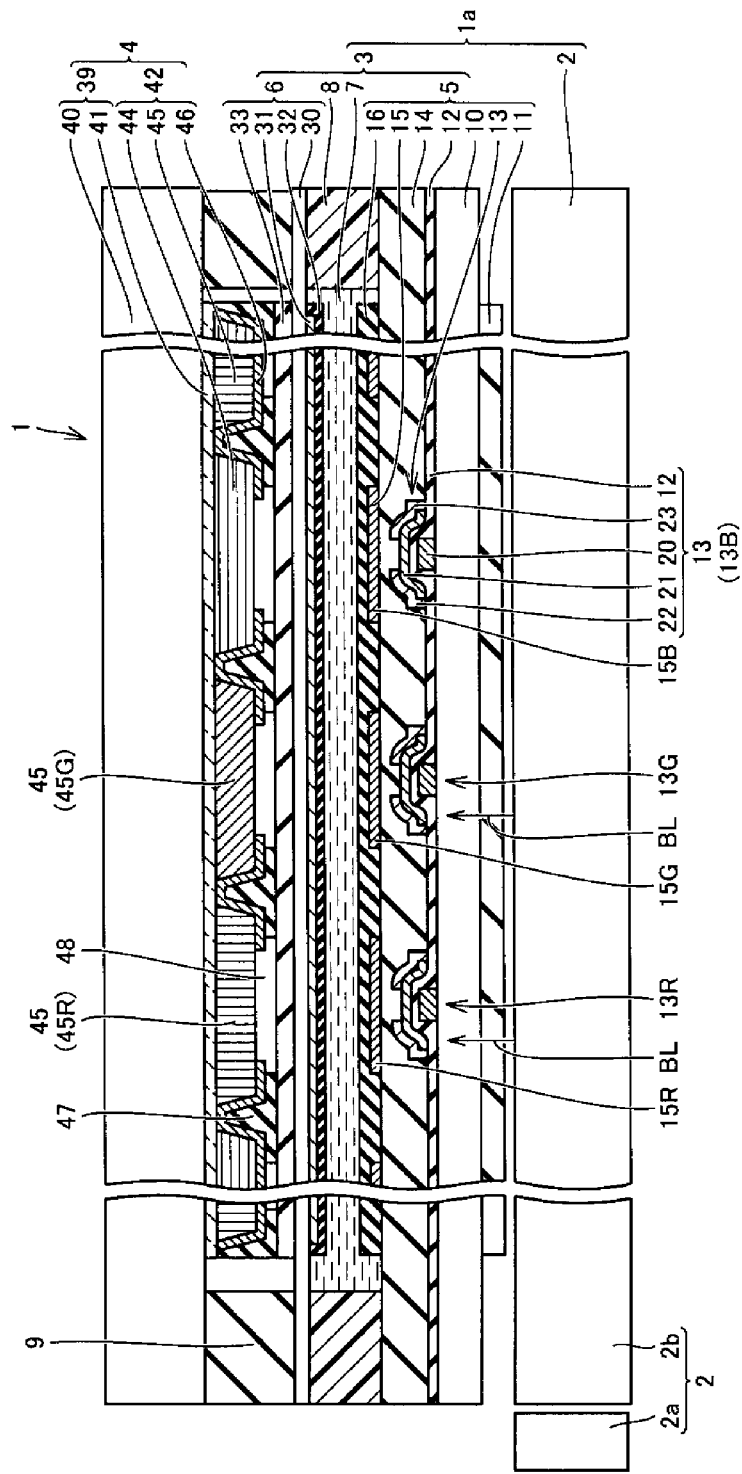
FIG. 23 is a cross-sectional view of a display device 1 according to Embodiment 3.

FIG. 23 is a cross-sectional view of the display device 1 of Embodiment 3. In FIG. 23, the display device 1 includes a light source unit 1a, a color conversion substrate 4 disposed on the top face of the light source unit 1a, and a plurality of spacers 47 disposed between the top face of the light source unit 1a and the bottom face of the color conversion substrate 4. The light source unit 1a is formed in a similar manner to the transparent substrate 10 of Embodiment 1 mentioned above. The color conversion substrate 4 has a main plate 39 having a top face and a bottom face, and a phosphor layer 42 formed on the bottom face of the main plate 39. The main plate 39 includes a transparent substrate 40 and a low refractive index film 41 formed on the bottom face of the transparent substrate 40.

Figure 24:
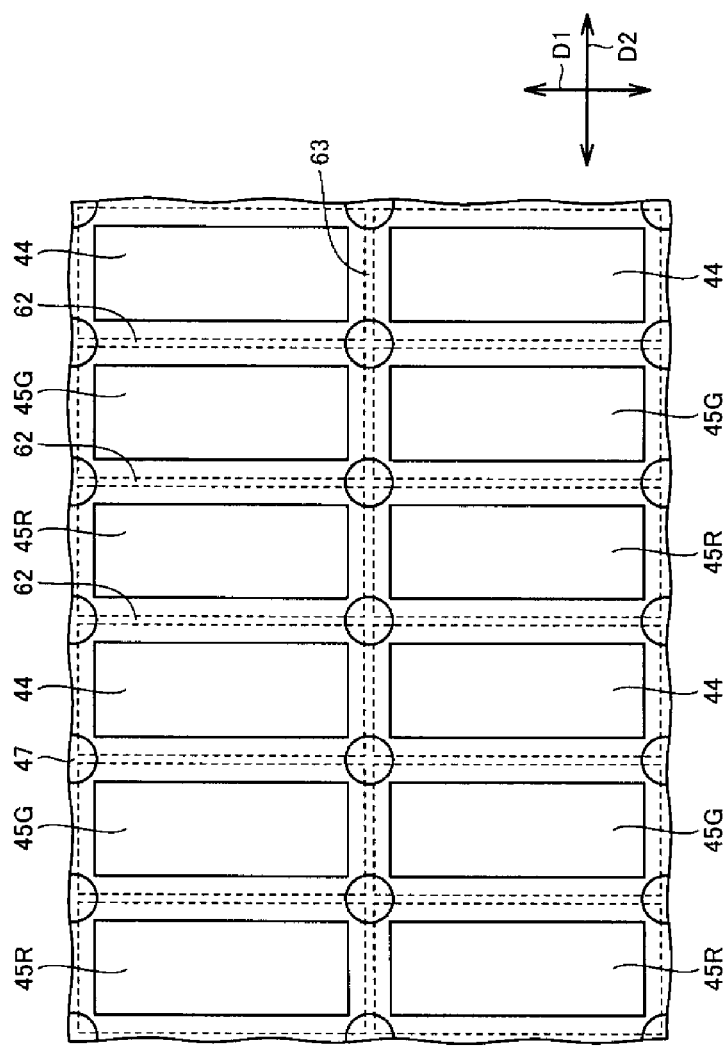
FIG. 24 is a plan view showing a color conversion substrate 4.

The phosphor layer 42 includes a plurality of light scattering members 44, a plurality of red phosphors 45R, a plurality of green phosphors 45G, and a reflective member 46. FIG. 24 is a plan view showing the color conversion substrate 4. As shown in FIG. 24, a plurality of the light scattering members 44, the red phosphors 45R, and the green phosphors 45G are aligned in an array direction D2 one after another with a gap therebetween.

A plurality of light scattering members 44 are aligned in an array direction D1 with a gap therebetween. A plurality of the green phosphors 45G are aligned in the array direction D1 with a gap therebetween, and a plurality of the red phosphors 45R are aligned along the array direction D1 with a gap therebetween.

Furthermore, grooves 62 are respectively formed between the green phosphor 45G and the light scattering member 44, between the green phosphor 45G and the red phosphor 45R, and between the red phosphor 45R and the light scattering member 44. The grooves 62 extend along the array direction D1. The color conversion substrate 4 has a groove 63 that intersects with the grooves 62. This groove 63 is formed so as to extend along the array direction D2.

Figure 25:
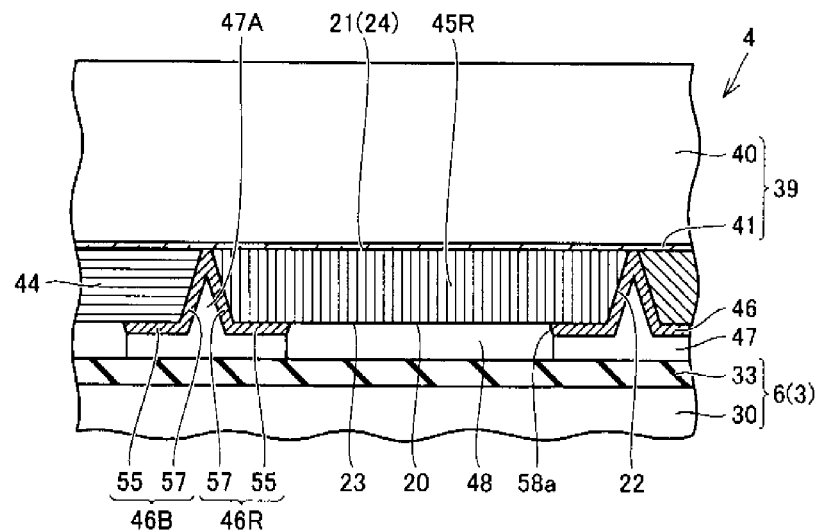
FIG. 25 is a cross-sectional view that shows a configuration of a red phosphor 45R and the periphery thereof.

FIG. 25 is a cross-sectional view that shows a configuration of the red phosphor 45R and the periphery thereof. As shown in FIG. 25, the red phosphor 45R is formed on the bottom face of the main plate 39. The reflective member 46 is disposed farther towards the light shutter 3 than the red phosphor 45R.

The red phosphor 45R has a top face 24 that is in contact with the low refractive index film 41, a bottom face 23 that faces the light shutter 3, and a side face 22 that is between the top face 24 and the bottom face 23. A resin layer 43 is not formed in Embodiment 3. The reflective member 46 includes the outer wall 57 formed on the side face 22 of the red phosphor 45R and the bottom face portion 55 formed on the bottom face 23 of the red phosphor 45R.

Here, if the blue light BL enters the red phosphor 45R, then the red phosphor 45R emits red light RL in a radial manner. Even if a portion of the red light RL is about to leak from the side face 22, the outer wall 57 reflects the red light RL. In particular, the outer wall 57 is formed so as to have a slope shape that becomes wider as the outer wall 57 extends towards the transparent substrate 40 from the light shutter 3 side. As a result, the red light RL that heads towards the outside from the side face 22 can be reflected towards the transparent substrate 40 in a desirable manner. Furthermore, the bottom face portion 55 reflects the red light RL traveling towards the light shutter 3. In this manner, improvement in light use efficiency of the light emitted by the red phosphor 45R is also achieved in the display device 1 according to Embodiment 3.

An opening 58a that exposes a portion of the bottom face 23 is formed in the bottom face portion 55. Of the bottom face 23, the portion of the opening 58a that is exposed is a receiving surface 20. Here, the spacer 47 is disposed between the reflective member 46 and the light shutter 3. By disposing the spacer 47 in this manner, an air layer 48 is formed between the light shutter 3 and the receiving surface 20.

Therefore, similar to the display device 1 in Embodiment 1, the display device 1 of Embodiment 3 can also reflect at least a portion of the red light RL traveling towards the light shutter 3 from the red phosphor 45R, resulting in an improvement in light use efficiency.

Figure 26:
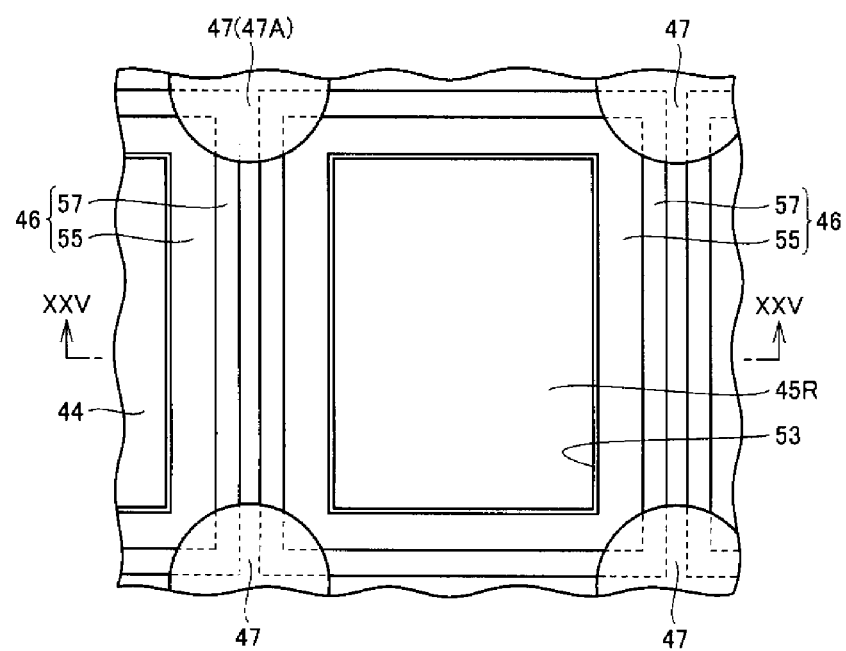
FIG. 26 is a plan view showing the red phosphor 45R and the periphery thereof.

FIG. 26 is a plan view showing the red phosphor 45R and the periphery thereof. As shown in FIGS. 26 and 24, the red phosphor 45R, the green phosphor 45G, and the light scattering member 44 are all formed in a rectangular shape. Furthermore, the color conversion substrate 4 in a plan view has the spacer 47 that is disposed above the corner portions of the two adjacent green phosphors 45G and the corner portions of the two adjacent red phosphors 45R. In particular, as shown in FIG. 24, the spacer 47 is formed where the grooves 62 and 63 intersect. Furthermore, when viewing the color conversion substrate 4 in a plan view, the spacer 47 is formed so as to have a circular shape. As for the shape of the spacer 47 or the like, various shapes can be adopted.

Figure 27:
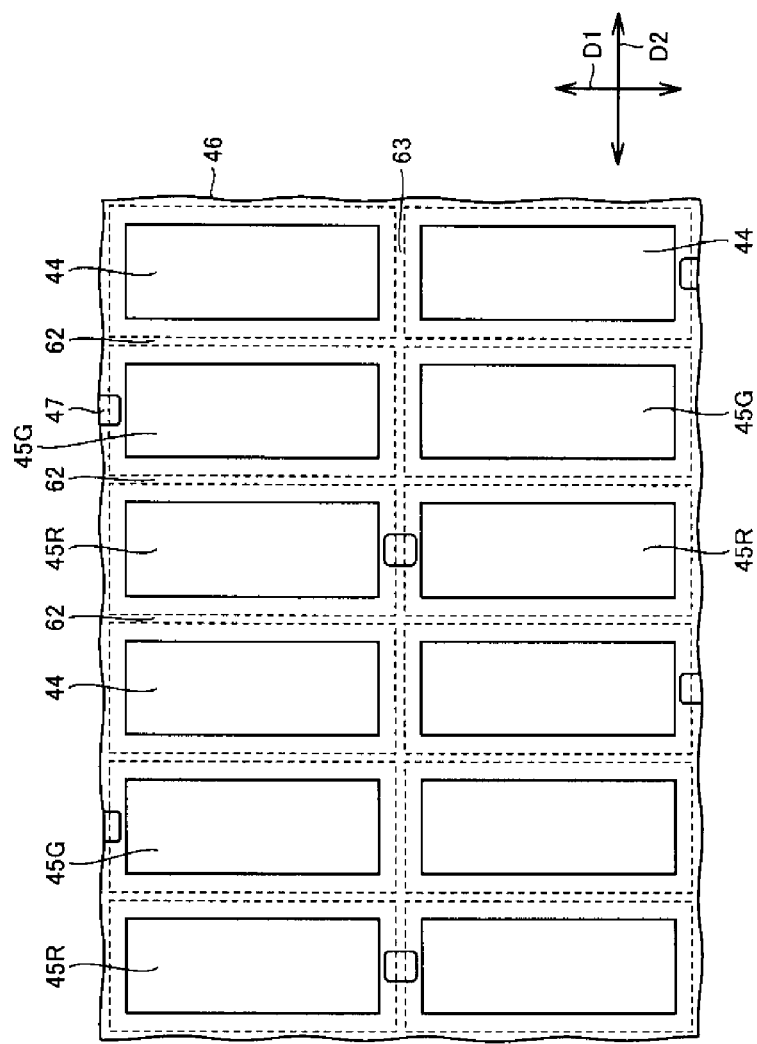
FIG. 27 is a plan view showing a first modification example of the color conversion substrate 4 related to Embodiment 3.

FIG. 27 is a plan view showing a first modification example of the color conversion substrate 4 related to Embodiment 3. As shown in FIG. 27, when viewing the color conversion substrate 4 in a plan view, the spacer 47 is formed so as to have a rectangular shape. In the example shown in FIG. 27, the spacer 47 is formed in the groove 63.

Figure 28:
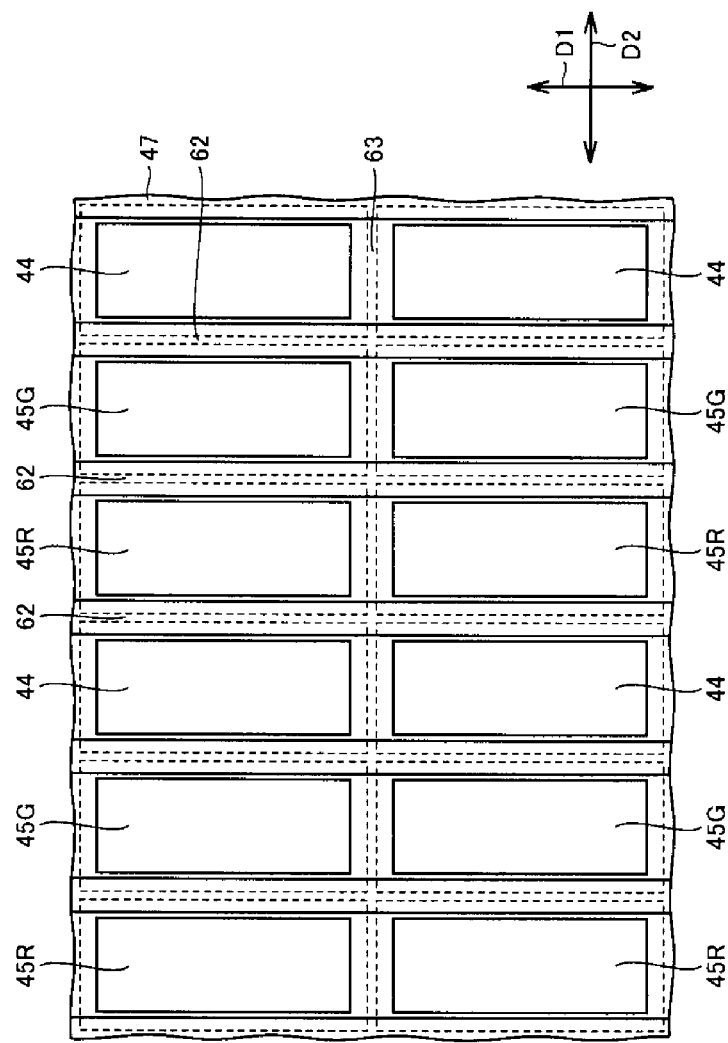
FIG. 28 is a plan view showing a second modification example of the color conversion substrate 4 related to Embodiment 3.

FIG. 28 is a plan view showing a second modification example of the color conversion substrate 4 related to Embodiment 3. In FIG. 28, the spacer 47 is formed in the groove 62 so as to extend in the array direction D1.

In the example shown in FIG. 28, the spacer 47 is disposed between the reflective member 46 and the light shutter 3 as shown in FIG. 25. As a result, light from the red phosphor 45R can be suppressed from entering the adjacent green phosphor 45G and the adjacent light scattering member 44, for example.

Figure 29:
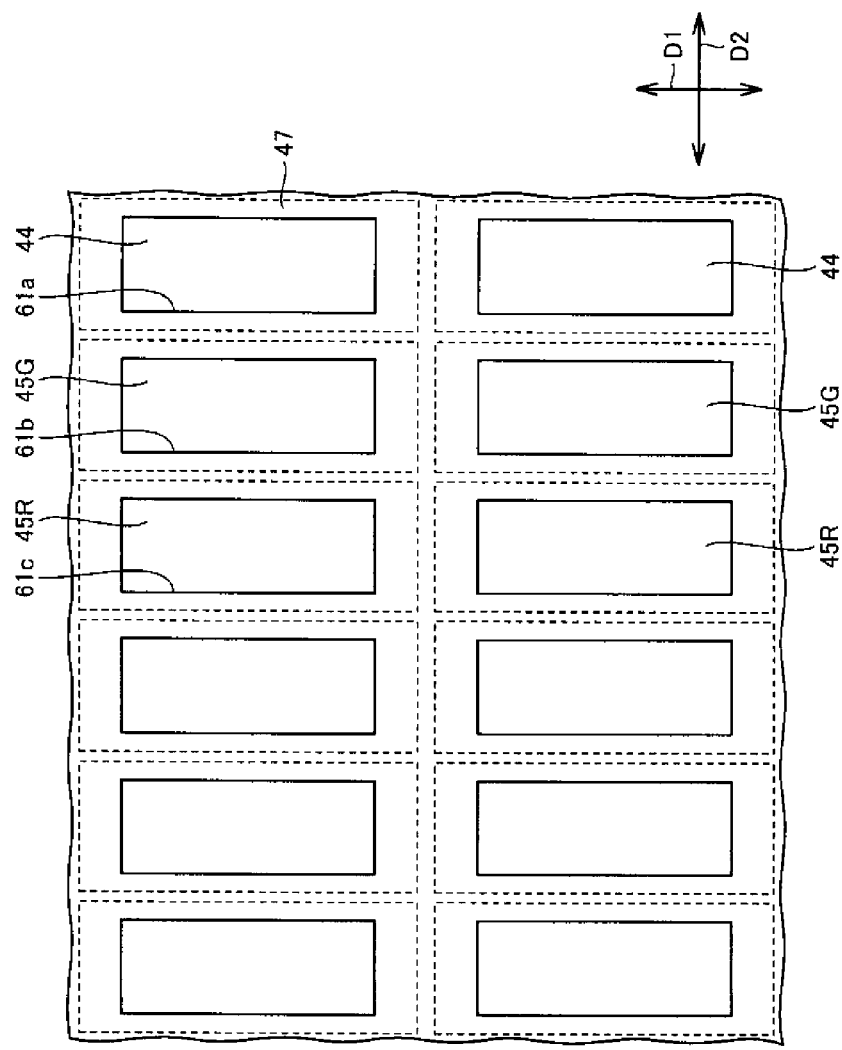
FIG. 29 is a plan view showing a third modification example of the color conversion substrate 4 related to Embodiment 3.

FIG. 29 is a plan view showing a third modification example of the color conversion substrate 4 related to Embodiment 3. In the example shown in FIG. 29, the spacer 47 is formed so as to cover substantially the entire surface of the bottom face of the color conversion substrate 4, and a plurality of openings 61a, 61b, and 61c are formed in the spacer 47.

Figure 30:
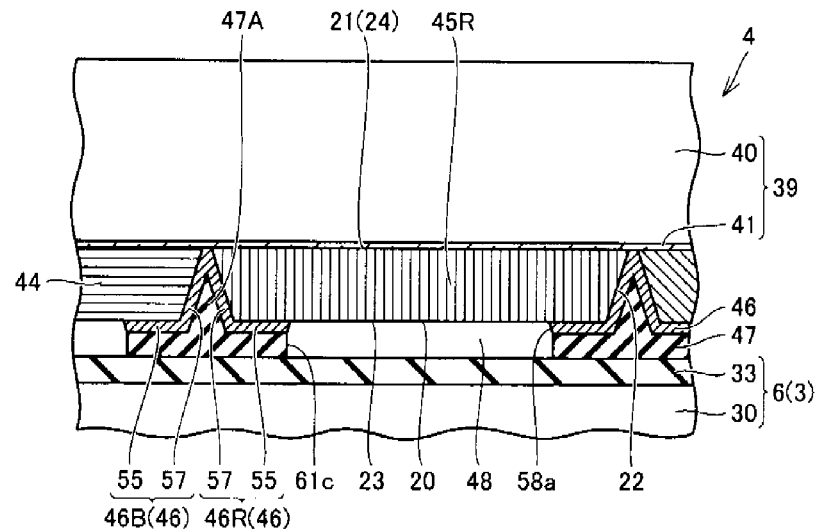
FIG. 30 is a cross-sectional view showing the configuration of the red phosphor 45R and the periphery thereof.

FIG. 30 is a cross-sectional view showing the configuration of the red phosphor 45R and the periphery thereof. As shown in FIG. 30, the spacer 47 is disposed between the reflective member 46 and the light shutter 3. In particular, the spacer 47 is formed between the light shutter 3 and both the bottom face portion 55 and the outer wall 57 of the reflective member 46. Then, a portion of the bottom face 23 of the green phosphor 45G is exposed through the opening 58a in the bottom face portion 55 and through the opening 61c in the spacer 47. As a result, the receiving surface 20 is formed.

Figure 31:
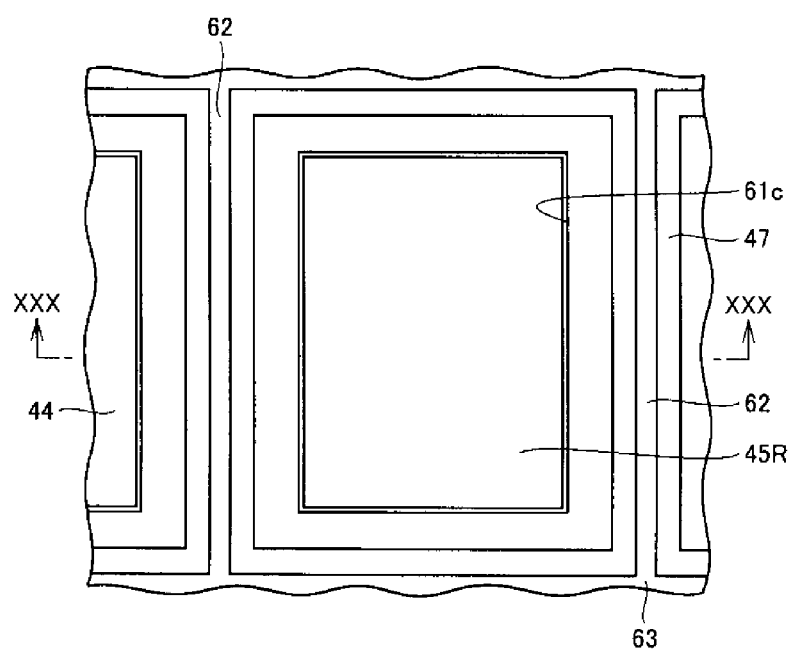
FIG. 31 is a plan view showing the configuration of the red phosphor 45R and the periphery thereof.

The air layer 48 is formed between the red phosphor 45R and the light shutter 3. FIG. 31 is a plan view showing the configuration of the red phosphor 45R and the periphery thereof. As shown in FIG. 31, the spacer 47 is formed so as to fill the grooves 62 and 63.

By forming the spacer 47 in this manner, the light emitted by the green phosphor 45G can be suppressed from entering the adjacent red phosphor 45R, the light scattering member 44, and the green phosphor 45G, for example.

Figure 32:
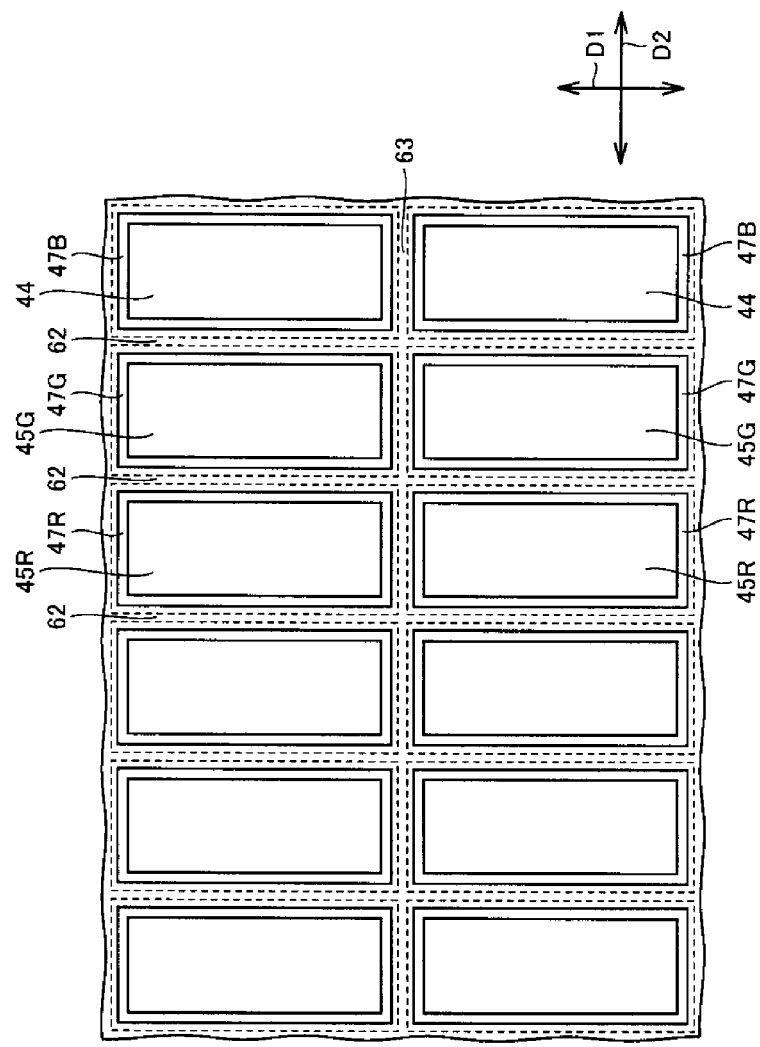
FIG. 32 is a plan view showing a fourth modification example of the color conversion substrate 4 related to Embodiment 3.
Figure 33:
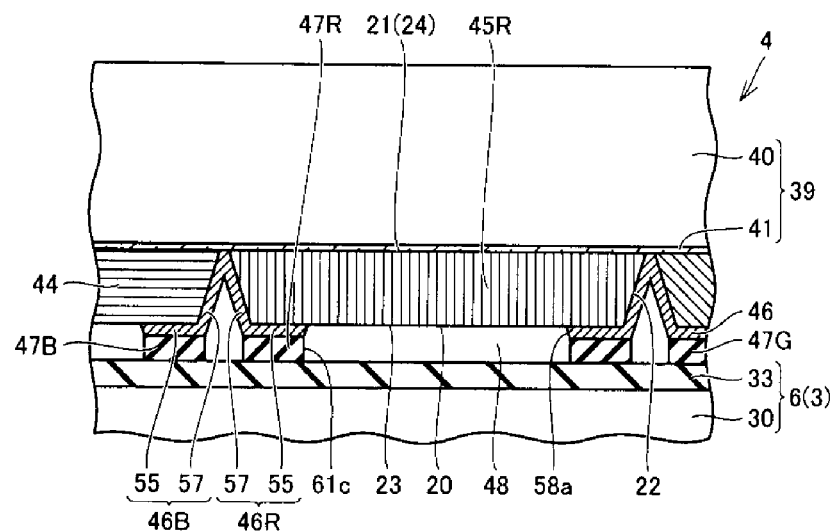
FIG. 33 is a cross-sectional view that shows a configuration of a red phosphor 45R and the periphery thereof.

FIG. 32 is a plan view showing a fourth modification example of the color conversion substrate 4 related to Embodiment 3. As shown in FIG. 32, the spacer 47 includes a plurality of frame shaped spacers 47R, 47G, and 47B. FIG. 33 is a cross-sectional view that shows a configuration of the red phosphor 45R and the periphery thereof. As shown in FIG. 33, the spacer 47R is formed between the bottom face portion 55 of the reflective member 46R and the light shutter 3. As a result, the air layer 48 is formed between the red phosphor 45R and the light shutter 3.

The receiving surface 20 is formed by exposing a portion of the bottom face 23 of the red phosphor 45R through the opening 58a in the reflective member 46 and the opening 61c in the spacer 47R.

The spacer 47G is formed between the bottom face portion 55 of the reflective member 46G and the light shutter 3. The spacer 47B is formed between the bottom face portion 55 and the light shutter 3. An air layer is also formed between the green phosphor 45G and the light shutter 3, and between the light scattering member 44 and the light shutter 3.

Figure 34:
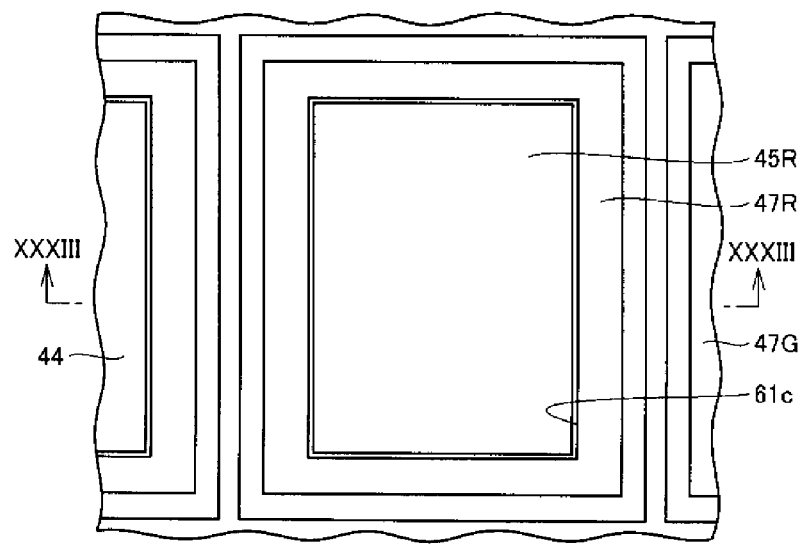
FIG. 34 is a plan view that shows a configuration of a red phosphor 45R and the periphery thereof.

FIG. 34 is a plan view that shows a configuration of the red phosphor 45R and the periphery thereof. As shown in FIG. 34, the spacer 47R has a rectangular frame shape, and the opening 61c is formed therein.

In FIGS. 33 and 34, the light from the red phosphor 45R is suppressed from entering the adjacent red phosphor 45R, the green phosphor 45G, and the light scattering member 44, because the spacer 47R is formed in a loop shape so as to surround the receiving surface 20.

Furthermore, because the spacer 47R is formed in a loop shape, even if external force is exerted on the display device 1, the air layer 48 formed between the red phosphor 45R and the light shutter 3 can suppress light from leaking outside.

Embodiments of the present invention have been described above, but these embodiments are examples in every respect, and not limiting. The scope of the present invention is defined by the claims, and all modifications with the same meaning as the claims and within the scope defined thereby are included. In addition, the numbers and the like mentioned above are examples, and the present invention is not limited to such numbers or ranges.

DESCRIPTION OF REFERENCE CHARACTERS 1 display device
1a light source unit
2 light source module
2a LED
2b light guide plate
3 light shutter
4 color conversion substrate
5 substrate
6 opposite substrate
7 liquid crystal layer
8 sealing member
9 fixing member
10, 40 transparent substrate
11, 33 polarizing plate
12 gate insulating film
13, 13R, 13G, 13B transistor
14 interlayer insulating film
15, 15R, 15G, 15B pixel electrode
16, 32 alignment film
20 receiving surface
21 emitting surface
22 side face
23 bottom face
24, 25 top face
27 inner surface
28 outer surface
30 glass substrate
31 common electrode
36, 37, 62, 63 groove
39 main plate
41 low refractive index film
42 phosphor layer
43, 43B, 43G, 43R resin layer
44 light scattering member
45 phosphor
45G green phosphor
45R red phosphor
46, 46B, 46G, 46R reflective member
47, 47A, 47B, 47G, 47R spacer
48 air layer
49 transparent inorganic film

The invention claimed is:

1. A display device, comprising:
a light source unit that emits light; and
a color conversion substrate above the light source unit, including:
  a transparent substrate;
  a plurality of phosphors arranged on a main surface of the transparent substrate facing the light source unit, said phosphors receiving light from said light source unit and emitting light in response thereto;
  a low refractive index layer that is formed between the phosphors and the transparent substrate and that has a lower refractive index than the phosphors; and
  a reflective member that reflects light that is emitted sideways by the respective phosphors, said reflective member having a plurality of openings therein and being disposed so as to cover at least edges of the respective phosphors,
wherein the phosphors and the light source unit are configured to define an air layer therebetween.

2. The display device according to claim 1, further comprising:
a spacer disposed between the color conversion substrate and the light source unit.

3. The display device according to claim 2, wherein the spacer is disposed between the reflective member and the light source unit.

4. The display device according to claim 2, wherein a plurality of the spacers are provided between the color conversion substrate and the light source unit.

5. The display device according to claim 2,
wherein the color conversion substrate includes a transparent resin pattern disposed in spaces between the phosphors,
wherein the transparent resin pattern has a groove formed between the phosphors, and wherein the spacer is formed between the phosphors in an extending direction of the groove.

6. The display device according to claim 2,
wherein the plurality of phosphors are arranged so as to have gaps therebetween, and
wherein the spacer is disposed between the phosphors.

7. The display device according to claim 2,
wherein the phosphors each have a receiving surface that faces the light source unit and receives light therefrom, and
wherein the spacer is formed in a looped shape so as to extend along a periphery of the receiving surface of the respective phosphors.

8. The display device according to claim 2, wherein the spacer is formed of a material having light-shielding characteristics.

9. The display device according to claim 1, further comprising:
a light scattering member formed on a main surface of the transparent substrate,
wherein the light source unit and the light scattering member are configured to define an air layer therebetween.

10. The display device according to claim 1,
wherein each of the phosphors includes a receiving surface that receives light from the light source unit, an emitting surface that is opposite to the transparent substrate, and side faces,
wherein the color conversion substrate includes a transparent resin pattern that covers the side faces of the respective phosphors,
wherein the transparent resin pattern has a protrusion that protrudes farther towards the light source unit than the receiving surface of the respective phosphors, and
wherein the respective phosphors and the light source unit are configured to define an air layer between said receiving surface of the respective phosphors and the light source unit.

11. The display device according to claim 10,
wherein the transparent resin pattern is formed in a looped shape so as to surround the respective phosphors,
wherein the resin layer further includes a surface facing the light source unit and side faces attached to the side faces of the respective phosphors, and
wherein the reflective member is formed across the side faces of the resin layer facing the light source unit so as to cover said side faces of the respective phosphors.

\* \* \* \* \*